(12) United States Patent  
Nagatsuka et al.

(10) Patent No.: US 12,362,418 B2  
(45) Date of Patent: Jul. 15, 2025

(54) VEHICULAR BATTERY CASE

(71) Applicant: AISIN CORPORATION, Aichi (JP)

(72) Inventors: Kanna Nagatsuka, Kariya (JP); Naoyuki Ota, Kariya-shi (JP); Masato Oishi, Kariya (JP); Hiroshi Okazaki, Kariya (JP)

(73) Assignee: AISIN CORPORATION, Kariya (JP)

( * ) Notice: Subject to any disclaimer, the term of this patent is extended or adjusted under 35 U.S.C. 154(b) by 695 days.

(21) Appl. No.: 17/697,490

(22) Filed: Mar. 17, 2022

(65) Prior Publication Data

US 2022/0320654 A1     Oct. 6, 2022

(30) Foreign Application Priority Data

Mar. 30, 2021   (JP) .................................. 2021-057839  
Jan. 17, 2022   (JP) .................................. 2022-004847

(51) Int. Cl.
| | |
|---|---|
| *H01M 50/209* | (2021.01) |
| *B60K 1/04* | (2019.01) |
| *B60K 11/02* | (2006.01) |
| *B60L 58/24* | (2019.01) |
| *B60L 58/26* | (2019.01) |

(Continued)

(52) U.S. Cl.  
CPC ............. *H01M 50/209* (2021.01); *B60K 1/04* (2013.01); *B60L 58/24* (2019.02); *B60L 58/26* (2019.02); *H01M 10/613* (2015.04); *H01M 10/617* (2015.04); *H01M 10/625* (2015.04); *H01M 10/6567* (2015.04); *H01M 10/6568* (2015.04); *H01M 50/249* (2021.01);

(Continued)

(58) Field of Classification Search  
None  
See application file for complete search history.

(56) References Cited

U.S. PATENT DOCUMENTS 7,746,034 B2 *   6/2010  Lee ..................... H01M 50/289  
                                                                           429/83  
9,537,187 B2 *   1/2017  Chung ................ H01M 10/647  
(Continued)

FOREIGN PATENT DOCUMENTS

| CN | 112510286 A | * | 3/2021 |
|---|---|---|---|
| JP | 2019-55649 | | 4/2019 |
| JP | 2019-525397 | | 9/2019 |

*Primary Examiner* — Niki Bakhtiari  
*Assistant Examiner* — Dustin Van Kirk  
(74) *Attorney, Agent, or Firm* — Finnegan, Henderson, Farabow, Garrett and Dunner, LLP

(57) ABSTRACT

A vehicular battery case includes a bottom plate portion having a temperature-adjustment fluid path. The path includes first and second outer path portions being apart from each other; a central path portion positioned therebetween; a plurality of first intermediate path portions positioned between the first outer path portion and the central path portion, being in communication with the first outer path portion at an end on a side near the first outer path portion, and being in communication with the central path portion at an end near the central path portion; and a plurality of second intermediate path portions positioned between the second outer path portion and the central path portion, being in communication with the second outer path portion at an end on a side near the second outer path portion, and being in communication with the central path portion at an end near the central path portion.

10 Claims, 7 Drawing Sheets

(51) Int. Cl.
     *H01M 10/613*     (2014.01)
     *H01M 10/617*     (2014.01)
     *H01M 10/625*     (2014.01)
     *H01M 10/6567*     (2014.01)
     *H01M 10/6568*     (2014.01)
     *H01M 50/249*     (2021.01)

(52) U.S. Cl.
     CPC ....... *B60K 2001/0438* (2013.01); *B60K 11/02* (2013.01); *H01M 2220/20* (2013.01)

(56) References Cited

U.S. PATENT DOCUMENTS

| | | | |
|---|---|---|---|
| 2018/0013111 A1* | 1/2018 | Wuensche | H01M 50/242 |
| 2018/0013113 A1 | 1/2018 | Wuensche et al. | |
| 2020/0136205 A1* | 4/2020 | Graves | F28F 3/046 |

\* cited by examiner

VEHICULAR BATTERY CASE

CROSS REFERENCE TO RELATED APPLICATIONS

This application is based on and claims priority under 35 U.S.C. § 119 to Japanese Patent Application 2021-057839, filed on Mar. 30, 2021 and Japanese Patent Application 2022-4847, filed on Jan. 17, 2022, the entire contents of which are incorporated herein by reference.

TECHNICAL FIELD

This disclosure generally relates to a vehicular battery case.

BACKGROUND DISCUSSION

JP2019-55649A (Reference 1) discloses a battery temperature control system including a battery case (described as a "battery box" in Reference 1) in which a battery cell is located inside, and a water jacket is located outside. The water jacket is configured in such a way that a cooling medium can be introduced and discharged through an introduction hole and a discharge hole at both ends. Then, the water jacket is configured in such a way that a temperature difference can be restrained from being caused between both ends, by switching a direction of a flow of the cooling medium.

However, a configuration in which an introduction hole and a discharge hole are provided at both ends of a water jacket of a battery case, such as the temperature control system described in Reference 1, cannot prevent a temperature from being uneven between a central portion and both ends of the water jacket. Note that Reference 1 discloses a configuration in which an intermediate introduction portion for introducing a cooling medium is provided between an introduction hole and a discharge hole of a water jacket, and the cooling medium is introduced from the intermediate introduction portion, and discharged from the discharge hole. However, when the cooling medium is introduced from the intermediate introduction portion, the cooling medium does not flow between the introduction hole and the intermediate introduction portion, and therefore, a temperature adjustment between the introduction hole and the intermediate introduction portion cannot be made. Thus, a temperature of a battery cannot be prevented or well restrained from being uneven.

Furthermore, a temperature of a battery is influenced by a physical structure of a cooling medium path, but Reference 1 does not disclose a specific structure of a cooling medium path of a water jacket.

A need thus exists for a vehicular battery case which is not susceptible to the drawback mentioned above.

SUMMARY

A vehicular battery case according to this disclosure includes a bottom plate portion. The bottom plate portion has a plate shape extending in a first direction and a second direction being perpendicular to each other, and is provided, in one surface, with a region where a battery is mountable, and provided, inside, with a temperature adjustment path being a path in which a fluid for adjusting a temperature of the battery is passable. The temperature adjustment path includes a first outer path portion and a second outer path portion being apart from each other in the first direction and having parts extending in the second direction, a central path portion being positioned between the first outer path portion and the second outer path portion, and extending in the second direction, a plurality of first intermediate path portions being positioned between the first outer path portion and the intermediate path portion and inside the region in a third direction view perpendicular to the first direction and the second direction, extending in the first direction, being in communication with the first outer path portion at an end on a side near the first outer path portion in the first direction, and being in communication with the central path portion at an end on a side near the central path portion in the first direction, and a plurality of second intermediate path portions being positioned between the second outer path portion and the central path portion and inside the region in the third direction view, extending in the first direction, being in communication with the second outer path portion at an end on a side near the second outer path portion in the first direction, and being in communication with the central path portion at an end on a side near the central path portion in the first direction.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
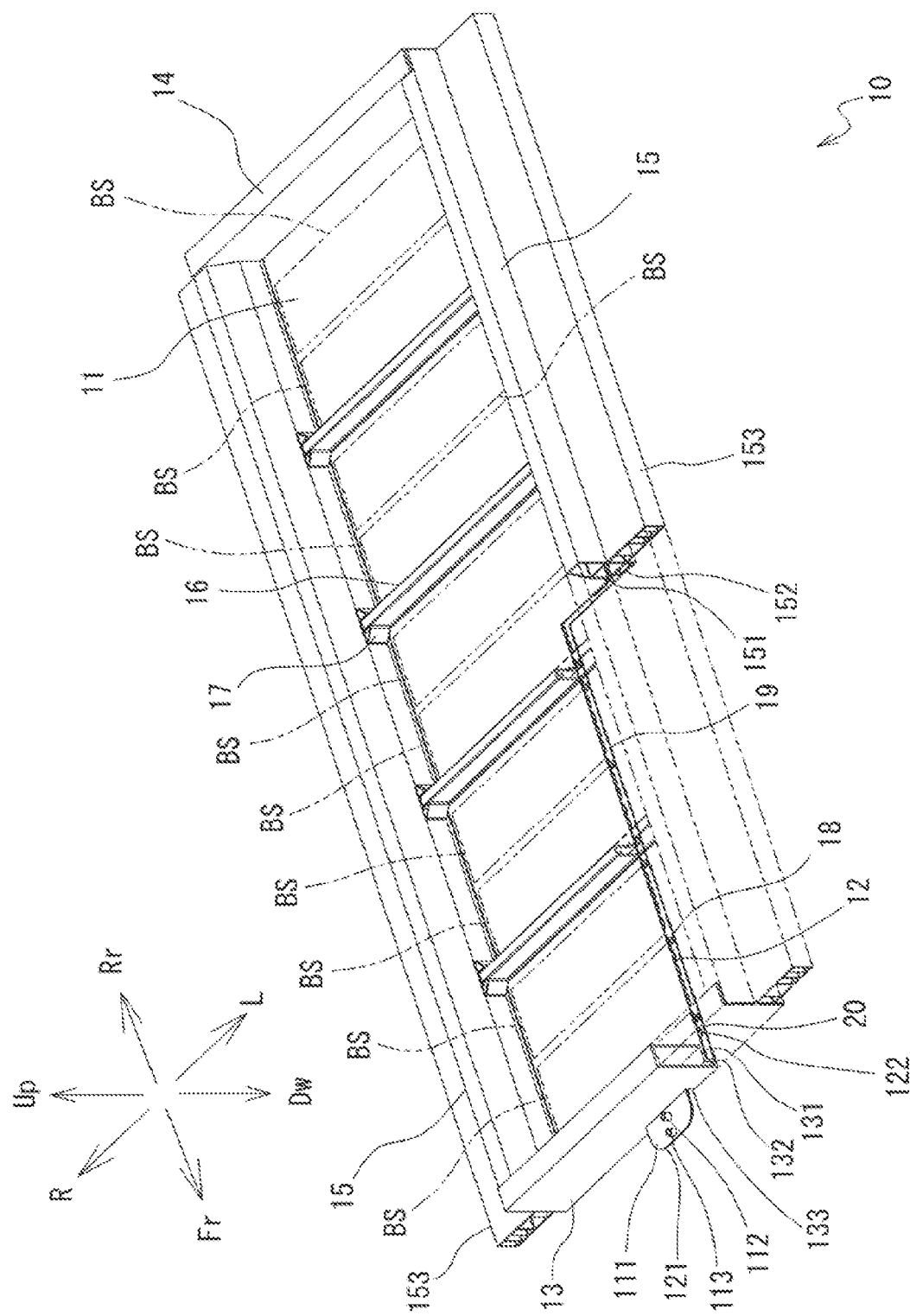
FIG. 1 is a perspective view illustrating a configuration of a battery case.

Hereinafter, an embodiment of this disclosure is described with reference to the drawings. Note that, in the following description, a vehicular battery case 10 according to the embodiment of this disclosure is simply abbreviated as "battery case 10". In the following description, each direction used for the battery case 10 is referenced to a direction in a state of being mounted to a vehicle (i.e., a direction of the vehicle). In each figure, a front side of the battery case 10 is indicated by an arrow Fr, a rear side is indicated by an arrow Rr, an upper side is indicated by an arrow Up, a lower side is indicated by an arrow Dw, a right side is indicated by an arrow R, and a left side is indicated by an arrow L. Note that, a left-right direction (vehicle width direction) is an example of a first direction of this disclosure, a front-rear direction is an example of a second direction of this disclosure, and an up-down direction is an example of a third direction of this disclosure, The battery case 10 is used for storage of a battery installed in an electric vehicle (an EV, a plug-in hybrid vehicle (PHV), a hybrid vehicle (HV), or the like). In this embodiment, a battery module 50 is disclosed as a battery being a storage target (see FIG. 2). The battery module 50 is an assembly in which a plurality of battery cells 501 arrayed in series are integrally coupled by a protection member 502 or the like. A shape of the battery module 50 in an up-down direction view is a substantially oblong shape being long in an array direction of a plurality of the battery cells 501. The battery case 10 includes a path (hereinafter, referred to as "temperature adjustment path 20") being located in a floor portion (a lower side of a seat) of a vehicle, and permitting a fluid such as water for temperature adjustment (hereinafter, referred to as "temperature adjustment fluid") to circulate. Then, the battery case 10 is configured to permit temperature adjustment (cooling and heating) of the battery module 50 by passing the temperature adjustment fluid through the temperature adjustment path 20. Moreover, each portion of the temperature adjustment path 20 is referred to as "path portion".

Figure 2:
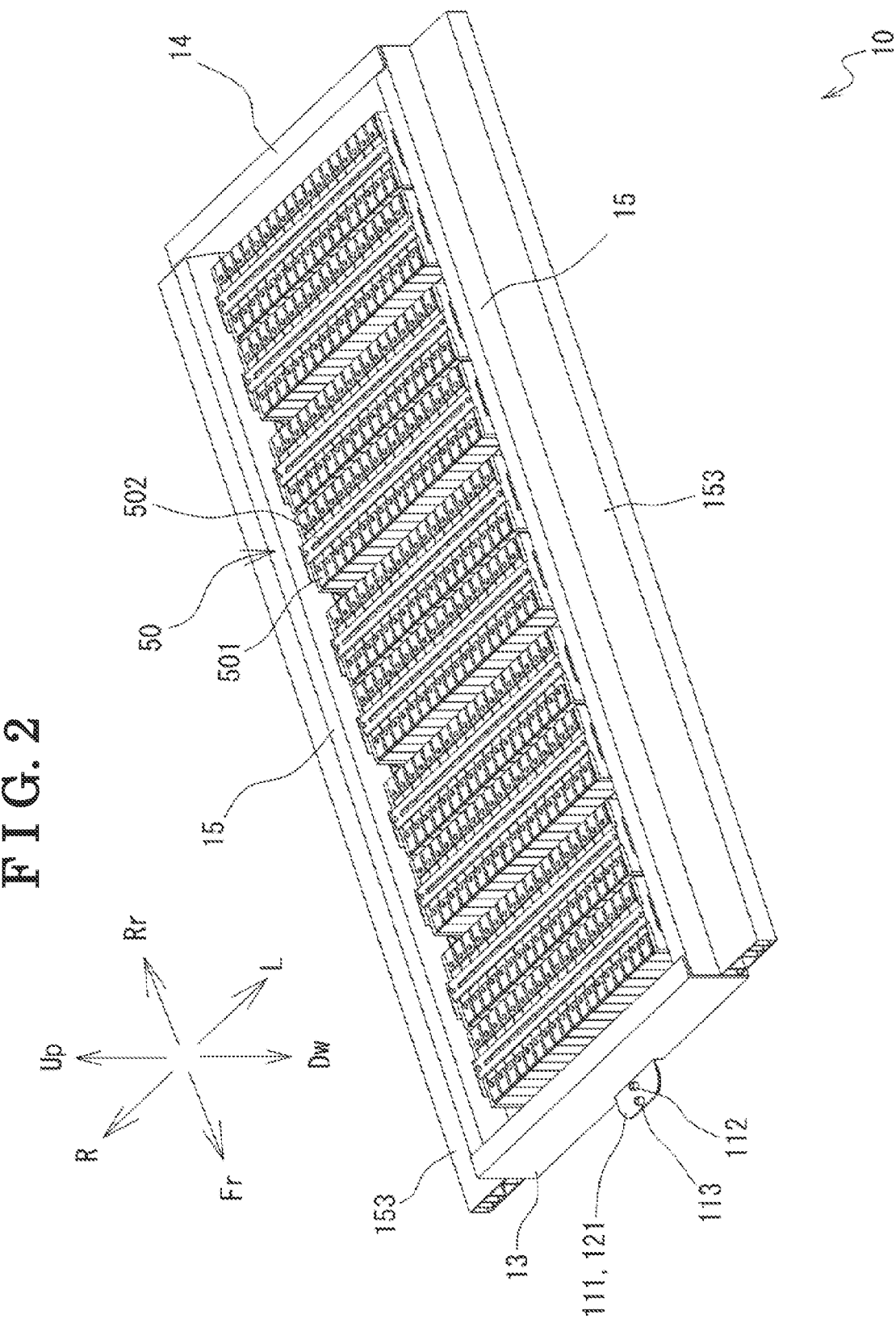
FIG. 2 is a perspective view illustrating the configuration of the battery case.
Figure 3:
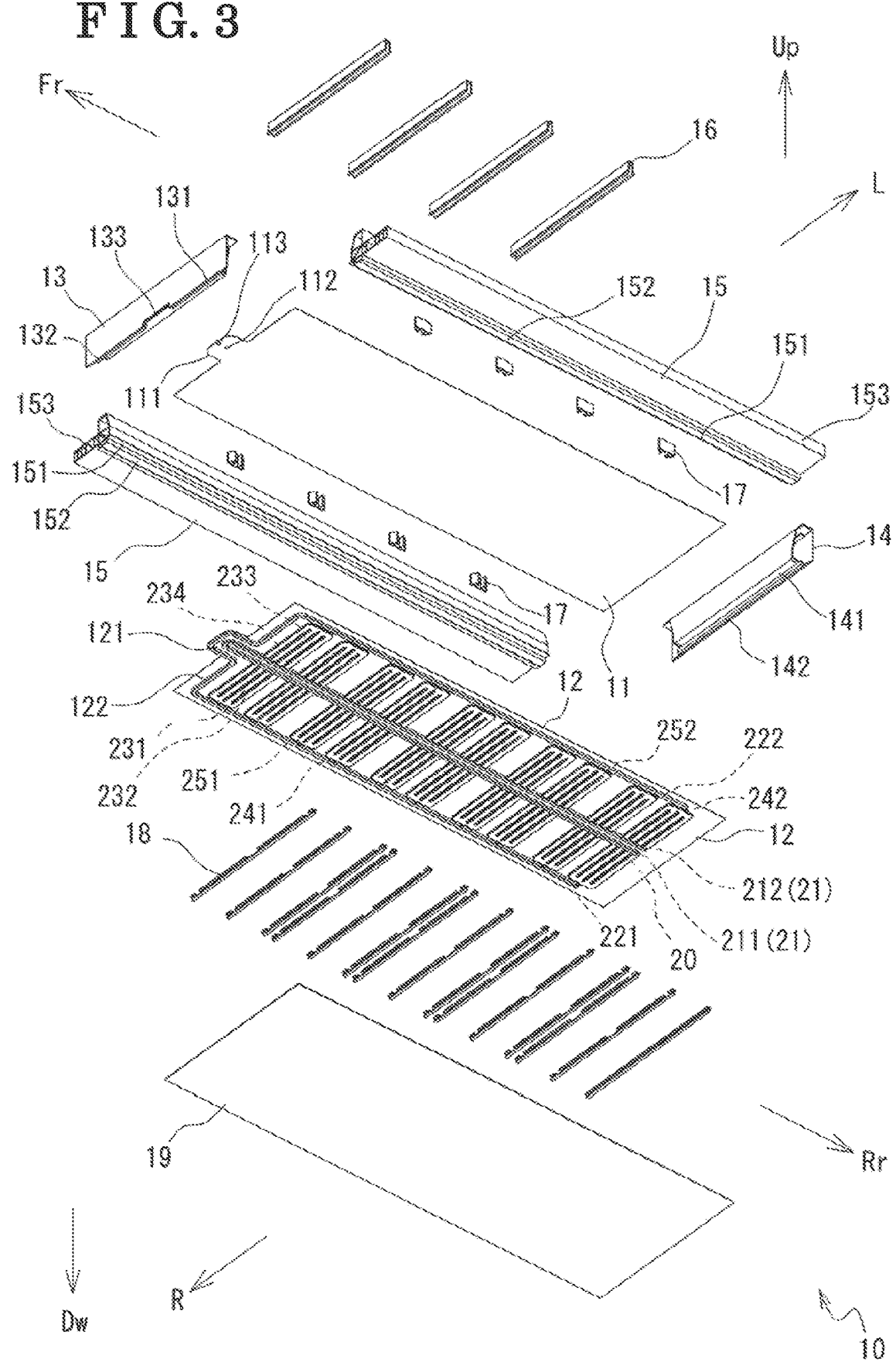
FIG. 3 is an exploded perspective view illustrating the configuration of the battery case.

First, an overall configuration of the battery case 10 is described. FIG. 1 is a perspective view illustrating a configuration of the battery case 10. FIG. 2 is a perspective view illustrating a state where the battery module 50 is stored in the battery case 10. FIG. 3 is an exploded perspective view illustrating the configuration of the battery case 10, and is a view seen from below.

As illustrated in FIGS. 1 to 3, the battery case 10 includes a lower panel 11, a heat sink 12, a front frame 13, a rear frame 14, two left and right side frames 15, a plurality of crosses 16, a plurality of cross support members 17, a plurality of lower frames 18, and a share panel 19. The battery case 10 has a substantially symmetrical configuration. Moreover, the battery case 10 has a substantially quadrilateral shape in an up-down direction view, and has a bottomed box-shaped structure opening on an upper side. Specifically, the lower panel 11, the heat sink 12, the lower frame 18, and the share panel 19 constitute "a bottom portion of a box", and the front frame 13, the rear frame 14, and the left and right side frames 15 constitute "a side wall portion of the box". Moreover, the front frame 13, the rear frame 14, and the left and right side frames 15 constitute a frame body having an opening on an inner peripheral side in an up-down direction. A plurality of the battery modules 50 are storable in an inner portion (i.e., a region surrounded by the front frame 13, the rear frame 14, and the left and right side frames 15) of the opening of the frame body. Further, a plurality of the crosses 16 are located apart from one another with predetermined intervals in a front-rear direction, on an upper surface side (a side where the battery module 50 is mountable) of the lower panel 11.

The battery case 10 has a double bottom structure including an inner bottom plate portion and an outer bottom plate portion apart from each other in an up-down direction. The inner bottom plate portion includes the lower panel 11 and the heat sink 12. The lower panel 11 and the heat sink 12 are stacked in an up-down direction, and are directly joined to each other. The temperature adjustment path 20 is provided between the lower panel 11 and the heat sink 12 (i.e., inside the inner bottom plate portion). Note that, a configuration of the temperature adjustment path 20 is described later. The share panel 19 is located under a stacked body of the lower panel 11 and the heat sink 12. Then, the share panel 19 forms an outer bottom plate portion of the double bottom structure. A plurality of the lower frames 18 are located between the stacked body (inner bottom plate portion) of the lower panel 11 and the heat sink 12 and the share panel 19 (outer bottom plate portion). Then, a space is formed between the stacked body of the lower panel 11 and the heat sink 12 and the share panel 19. Note that, an inner bottom plate portion (the stacked body of the lower panel 11 and the heat sink 12) is equivalent to a bottom plate portion.

A region where the battery module 50 is mountable is provided on the upper surface side of the lower panel 11. The front frame 13, the rear frame 14, and the left and right side frames 15 are located along outer peripheral portions of the lower panel 11 and the heat sink 12 in an up-down direction view, and are provided in such a way as to erect upwards from the outer peripheral portions. A frame body having an opening in which the battery module 50 is storable is formed by the frames. Then, the battery case 10 is capable of storing, within the opening described above, a plurality of the battery modules 50 in such a way that the battery modules 50 are arranged in a front-rear direction in a direction in which a longitudinal direction thereof becomes parallel to a left-right direction of the battery case 10. Specifically, the battery case 10 is configured in such a way that two battery modules 50 are storable (in other words, mountable) in each of a region between the crosses 16 adjacent to each other, a region between the cross 16 positioned on a frontmost side and the front frame 13, and a region between the cross 16 positioned on a rearmost side and the rear frame 14.

Next, each member of the battery case 10 is described. As illustrated in FIG. 3, each of the lower panel 11 and the heat sink 12 is a substantially quadrilateral and plate-shaped member in an up-down direction view. Moreover, the lower panel 11 and the heat sink 12 have substantially the same shape and substantially the same dimension in an up-down direction view. The lower panel 11 and the heat sink 12 are each molded by, for example, an aluminum plate.

The lower panel 11 and the heat sink 12 each have a substantially symmetrical shape. Extension portions 111 and 121 extending toward a front side are provided in central portions, in a left-right direction, of front ends (front sides) of the lower panel 11 and the heat sink 12. Two supply-discharge portions being a first supply-discharge portion 112 and a second supply-discharge portion 113 are provided in the extension portion 111 of the lower panel 11. The first supply-discharge portion 112 and the second supply-discharge portion 113 are bores that bring, into communication, inside and outside of the temperature adjustment path 20 between the lower panel 11 and the heat sink 12. Supply of the temperature adjustment fluid to the temperature adjustment path 20, and discharge of the temperature adjustment fluid from the temperature adjustment path 20 are permitted via the first supply-discharge portion 112 and the second supply-discharge portion 113.

A plurality of battery mounting spaces BS where the battery modules 50 are mountable are provided on an upper surface of the lower panel 11. In other words, a plurality of the battery modules 50 are mountable on the upper surface of the lower panel 11 in a state where lower surfaces of the battery modules 50 contact. In this case, a region where a lower surface of each of the mounted battery modules 50 contacts is the battery mounting space BS. Note that, one battery module 50 is mountable in one battery mounting space BS. Then, each of the battery mounting spaces BS is configured in such a way that each of the battery modules 50 can be mounted with the longitudinal direction thereof being in a direction parallel to a left-right direction. Specifically, each of the battery mounting spaces BS is an oblong region having substantially the same shape and dimension as each of the battery modules 50 in an up-down direction view, and being long in a left-right direction.

A path wall portion 122 constituting the temperature adjustment path 20 is provided in the heat sink 12. The path wall portion 122 is a bottomed groove portion (recess)

opening on an upper side, and molded by press working. Thus, the path wall portion 122 bulges toward a lower side.

Each of the front frame 13, the rear frame 14, and the left and right side frames 15 is a hollow, long, and rod-shaped member, and is formed in such a way as to have a predetermined thickness in a width direction (a front-rear direction regarding the front frame 13 and the rear frame 14, and a left-right direction regarding the side frame 15) being a direction orthogonal to a direction along outer peripheries of the lower panel 11, the heat sink 12, and the share panel 19 in an up-down direction view. For example, an aluminum extruded material is applied to each of the front frame 13, the rear frame 14, and the left and right side frames 15.

The front frame 13 and the rear frame 14 are located apart from and parallel to each other in a front-rear direction, in a direction in which the longitudinal directions thereof are parallel to a left-right direction (vehicle width direction). Lower portions of the front frame 13 and the rear frame 14 are configured in such a way that the stacked body (inner bottom plate portion) of the lower panel 11 and the heat sink 12 and the share panel 19 (outer bottom plate portion) can be joined in a state of being apart from each other in an up-down direction. Specifically, first joint surfaces 131 and 141 to which the stacked body of the lower panel 11 and the heat sink 12 is joined, and second joint surfaces 132 and 142 to which the share panel 19 is joined are formed in the lower portions of the front frame 13 and the rear frame 14. Each of the first joint surfaces 131 and 141 and the second joint surfaces 132 and 142 is a band-shaped plane being long in a left-right direction, and is a plane being perpendicular to an up-down direction and facing toward a lower side.

The first joint surfaces 131 and 141 and the second joint surfaces 132 and 142 are out of alignment with each other in a front-rear direction and an up-down direction, and are not superposed over each other in an up-down direction view. Moreover, the second joint surfaces 132 and 142 are positioned lower than the first joint surfaces 131 and 141. Note that, in the front frame 13, the first joint surface 131 is positioned closer to a rear side than the second joint surface 132, and in the rear frame 14, the first joint surface 141 is positioned closer to a front side than the second joint surface 142. That is to say, the second joint surfaces 132 and 142 are positioned closer to outside (an outer peripheral side) and a lower side of a quadrilateral frame body formed by the front frame 13, the rear frame 14, and the left and right side frames 15, than the first joint surfaces 131 and 141.

A depressed portion 133 for avoiding interference with the extension portions 111 and 121 of the lower panel 11 and the heat sink 12 is provided in a lower portion of the front frame 13. The depressed portion 133 is open on a lower side in such a way that the lower panel 11 and the heat sink 12 can be attached from a lower side of the front frame 13.

The left and right side frames 15 are located apart from and parallel to each other in a left-right direction, in a direction in which the longitudinal directions thereof are parallel to a front-rear direction. Lower portions of the left and right side frames 15 are configured in such a way that the stacked body of the lower panel 11 and the heat sink 12 and the share panel 19 can be joined in a state of being apart from each other in an up-down direction. Specifically, a first joint surface 151 to which the stacked body of the lower panel 11 and the heat sink 12 is joined, and a second joint surface 152 to which the share panel 19 is joined are formed in the lower portion of each of the left and right side frames 15. Each of the first joint surface 151 and the second joint surface 152 is a band-shaped plane being long in a front-rear direction, and is a plane being perpendicular to an up-down direction and facing toward a lower side.

The first joint surface 151 and the second joint surface 152 are out of alignment with each other in a left-right direction and an up-down direction view, and are not superposed over each other in an up-down direction view. Moreover, the second joint surface 152 is positioned lower than the first joint surface 151. Note that, in the left side frame 15, the first joint surface 151 is positioned closer to a right side than the second joint surface 152, and in the right side frame 15, the first joint surface 151 is positioned closer to a left side than the second joint surface 152. That is to say, the second joint surface 152 is positioned closer to outside (an outer peripheral side) and a lower side of a substantially quadrilateral frame body formed by the front frame 13, the rear frame 14, and the left and right side frames 15, than the first joint surface 151.

The left and right side frames 15 each include an energy absorption portion 153. The energy absorption portion 153 is a portion protruding toward an opposite side (i.e., an outer side in a vehicle width direction) to a side where the left and right side frames 15 face each other, and extending in a front-rear direction, and is integrally connected to another part. A space (cavity) is formed inside the energy absorption portion 153. The energy absorption portion 153 is configured in such a way as to ease impulse on the battery module 50 by being deformed when a side impact or the like occurs.

A plurality of the crosses 16 are subjected to a load in a left-right direction when a side impact or the like occurs, and thereby prevent or restrain the side frame 15 from being deformed and contacting the battery module 50. Each of a plurality of the crosses 16 is a long and rod-shaped member, and for example, an aluminum extruded material is applied thereto. A plurality of the crosses 16 extend in a rod shape along an upper surface of the lower panel 11 in a direction in which the longitudinal directions thereof are parallel to a left-right direction, and are located to be arranged in a front-rear direction. Note that, although each figure illustrates an example in which a sectional shape of the cross 16 substantially quadrilateral, but a sectional shape of the cross 16 is not particularly limited.

The cross support member 17 is a member for fixing each of both ends of each of the crosses 16 in a longitudinal direction to each of the left and right side frames 15. For example, an aluminum extruded material is applied to the cross support member 17. However, a specific configuration of the cross support member 17 is not particularly limited. Each of the cross support members 17 may have a configuration that can fix each of both ends of each of the crosses 16 to each of the left and right side frames 15.

The lower frame 18 is a long and rod-shaped member, and for example, an aluminum extruded material is applied thereto. A depressed portion for avoiding interference with the path wall portion 122 of the heat sink 12 is provided on an upper end side of the lower frame 18. Note that, a sectional shape of the lower frame 18 is not particularly limited.

The share panel 19 is a substantially quadrilateral and plate-shaped member in an up-down direction view. For example, an aluminum plate is applied to the share panel 19.

Next, a mounting configuration of the battery case 10 is described.

An end of each of the front frame 13 and the rear frame 14 in a longitudinal direction and an end of each of the left and right side frames 15 in a longitudinal direction are joined to each other. Thereby, a substantially quadrilateral frame body having an opening on an inner peripheral side in an up-down direction view is formed. Then, a plurality of the crosses 16 are located inside the opening of the frame body in a direction in which the longitudinal directions thereof are substantially parallel to a longitudinal direction of each of the front frame 13 and the rear frame 14. Then, both ends of each of the crosses 16 are joined to the left and right side frames 15 via the cross support member 17, respectively.

The lower panel 11 and the heat sink 12 are located on lower sides of the front frame 13, the rear frame 14, and the left and right side frames 15. In this instance, outer peripheral portions of the lower panel 11 and the heat sink 12 are superposed over lower sides of the first joint surfaces 131, 141, and 151 of the front frame 13, the rear frame 14, and the left and right side frames 15. Then, the outer peripheral portions of the lower panel 11 and the heat sink 12 are joined to the first joint surfaces 131, 141, and 151 of the front frame 13, the rear frame 14, and the left and right side frames 15. Note that, root parts of the extension portions 111 and 121 of the lower panel 11 and the heat sink 12 are each fitted into the depressed portion 133 of the front frame 13, and tips (front ends) of the extension portions 111 and 121 protrude closer to a front side than a front surface of the front frame 13. Then, the first supply-discharge portion 112 and the second supply-discharge portion 113 provided in the extension portions 111 and 121 are positioned in a part protruding closer to a front side than a front surface of the front frame 13. That is to say, the first supply-discharge portion 112 and the second supply-discharge portion 113 are positioned closer to a front side (an outer peripheral side of the frame body) than a front surface of the front frame 13.

Furthermore, a lower surface of the cross 16 is joined to the lower panel 11. Then, the battery mounting spaces BS for two places are provided in each of a region between the crosses 16 adjacent to each other on an upper surface of the lower panel 11, a region between the cross 16 positioned on a frontmost side and the front frame 13, and a region between the cross 16 positioned on a rearmost side and the rear frame 14.

A plurality of the lower frames 18 are located on lower sides of the lower panel 11 and the heat sink 12. Specifically, a plurality of the lower frames 18 are located apart from one another in a front-rear direction in a direction in which the longitudinal directions thereof are parallel to a longitudinal direction of each of the front frame 13 and the rear frame 14. Then, an upper end (upper surface) of each of the lower frames 18 is joined to a lower surface of the heat sink 12.

The share panel 19 is located on lower sides of the lower panel 11, the heat sink 12, the left and right side frames 15, and a plurality of the lower frames 18. An outer peripheral portion of the share panel 19 is superposed over lower sides of the front frame 13, the rear frame 14, and the second joint surface 152 of the left and right side frames 15. Moreover, a lower end (lower surface) of each of the lower frames 18 is in contact with an upper surface of the share panel 19. Then, the outer peripheral portion of the share panel 19 is joined to the second joint surfaces 132, 142, and 152 of the front frame 13, the rear frame 14, and the left and right side frames 15. Further, the lower end (lower surface) of each of the lower frames 18 is joined to the share panel 19.

Note that, for example, laser welding is applied to joining of members forming the battery case 10.

Next, the temperature adjustment path 20 is described. An upper side of a recess formed by the path wall portion 122 is closed (in other words, brought into a state of being lidded) by the lower panel 11, by laying the lower panel 11 on an upper side of the heat sink 12. Thereby, the temperature adjustment path 20 permitting a temperature adjustment fluid to circulate is molded between the lower panel 11 and the heat sink 12 (in other words, inside the inner bottom plate portion).

Figure 4:
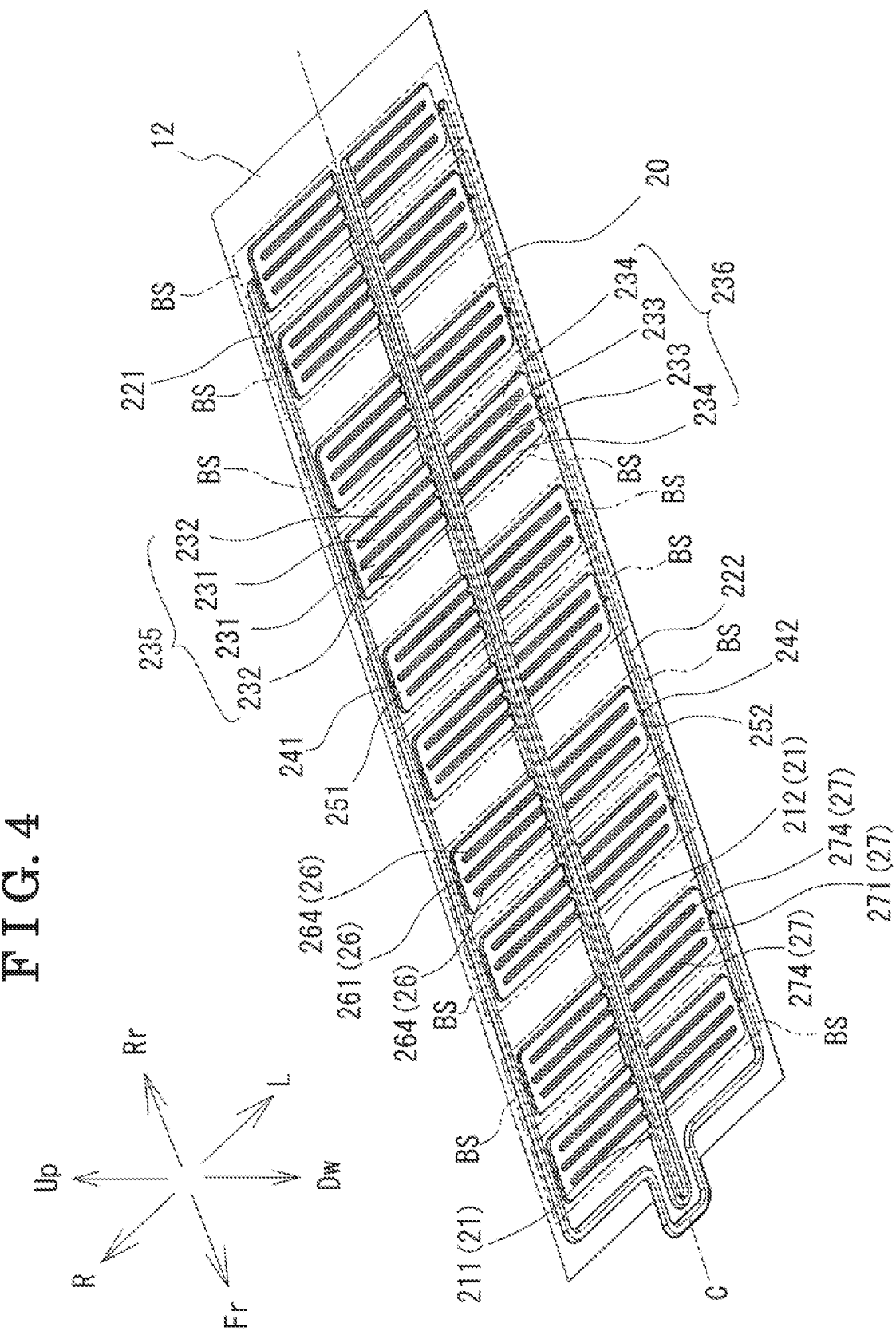
FIG. 4 is a perspective view illustrating a configuration of a heat sink.

FIG. 4 is a perspective view illustrating a configuration of the heat sink 12. Note that, in FIG. 4, a quadrilateral surrounded by a two-point chain line indicated by a reference sign BS indicates a region where the battery mounting space BS is projected in an up-down direction on the upper surface of the lower panel 11. For convenience of description, this region (i.e., a region superposed over the battery mounting space BS in an up-down direction view, in other words, a region immediately under the battery mounting space BS) is also referred to as a battery mounting space BS. As illustrated in FIG. 4, the temperature adjustment path 20 includes a central path portion 21, a first outer path portion 221, a second outer path portion 222, a plurality of first intermediate path portions 231 and 232, a plurality of second intermediate path portions 233 and 234, a plurality of first orifice portions 241, a plurality of second orifice portions 242, a plurality of first communication path portions 251, and a plurality of second communication path portions 252. Then, the temperature adjustment path 20 has a substantially bilaterally symmetrical configuration with an axis of symmetry being a straight line C (in this embodiment, this straight line corresponds to a center line C regarding a left-right direction (first direction) of the heat sink 12) passing through a center of a longitudinal direction (first direction) of each of the battery mounting spaces BS and extending in a front-rear direction. Hereinafter, the straight line C (the center line C regarding the left-right direction of the heat sink 12) passing through a center of a longitudinal direction of each of the battery mounting spaces BS and extending in a front-rear direction may be referred to as a main center line C.

The central path portion 21 is a path portion positioned substantially in a center of a left-right direction (first direction) of the lower panel 11 and the heat sink 12, and extending in a front-rear direction (second direction). The central path portion 21 includes two path portions being a first central path portion 211 and a second central path portion 212. The first central path portion 211 and the second central path portion 212 are provided at positions being bilaterally symmetrical with an axis of symmetry being the main center line C in an up-down direction view, and are proximate and adjacent to each other in a central portion of the lower panel 11 and the heat sink 12 in a left-right direction. Moreover, the central path portion 21 (the first central path portion 211 and the second central path portion 212) are positioned between the later-described first outer path portion 221 and second outer path portion 222 in relation to a first direction. Front-side ends of the first central path portion 211 and the second central path portion 212 are positioned in the extension portions 111 and 121 of the lower panel 11 and the heat sink 12, and are in communication with each other through the extension portions 111 and 121. Further, the first central path portion 211 and the second central path portion 212 are in communication with outside of the stacked body of the lower panel 11 and the heat sink 12 through the extension portions 111 and 121 via the first supply-discharge portion 112 provided at a place where the first central path portion 211 and the second central path portion 212 communicate with each other.

The first outer path portion 221 and the second outer path portion 222 are path portions having parts positioned in a vicinity of outer peripheries of the lower panel 11 and the heat sink 12 in a left-right direction, respectively, and have parts extending in a front-rear direction. Note that, the "parts extending in a front-rear direction" of the first outer path portion 221 and the second outer path portion 222 are parts provided along left and right ends (outer peripheries) of the lower panel 11 and the heat sink 12. The first outer path portion 221 and the second outer path portion 222 are provided at positions bilaterally symmetrical to each other with an axis of symmetry being the center line C in an up-down direction view. Further, the first outer path portion 221 is positioned on the same side as the first central path portion 211 when viewed from the main center line C, and second outer path portion 222 is positioned on the same side as the second central path portion 212 when viewed from the main center line C. In other words, the first outer path portion 221, the first central path portion 211, the second central path portion 212, and the second outer path portion 222 are arranged in this order from one end side (a right side in a vehicle width direction) of the battery mounting space BS in a longitudinal direction.

Then, the first outer path portion 221 passes through one end (right-side end) of each of the battery mounting spaces BS in a longitudinal direction, and the second outer path portion 222 passes through another end (left-side end) of each of the battery mounting spaces BS. Note that, the first outer path portion 221 and the second outer path portion 222 have parts passing through each of the battery mounting spaces BS in this embodiment, but are not limited to such a configuration. For example, the first outer path portion 221 and the second outer path portion 222 may not pass through each of the battery mounting spaces BS.

Vicinities of front ends of the first outer path portion 221 and the second outer path portion 222 extend in a left-right direction along front ends of the lower panel 11 and the heat sink 12. The front ends of the first outer path portion 221 and the second outer path portion 222 are positioned in the extension portions 111 and 121 of the lower panel 11 and the heat sink 12, and are in communication with each other through the extension portions 111 and 121. Then, the first outer path portion 221 and the second outer path portion 222 are in communication with outside of the stacked body of the lower panel 11 and the heat sink 12 through the extension portions 111 and 121 via the second supply-discharge portion 113 provided at a place where the first outer path portion 221 and the second outer path portion 222 communicate with each other. Note that, as understood from FIG. 4, the front ends of the first outer path portion 221 and the second outer path portion 222 in the extension portions 111 and 121 are formed in such a way as to surround front-side ends of the first central path portion 211 and the second central path portion 212.

Each of a plurality of the first intermediate path portions 231 and 232 and a plurality of the second intermediate path portions 233 and 234 is a path portion extending in a left-right direction. The first intermediate path portions 231 and 232 are positioned closer to a right side than the main center line C, and provided between the first central path portion 211 and the first outer path portion 221. The second intermediate path portions 233 and 234 are positioned closer to a left side than the main center line C, and provided between the second central path portion 212 and the second outer path portion 222. Note that, a plurality of the first intermediate path portions 231 and 232 and a plurality of the second intermediate path portions 233 and 234 are bilaterally symmetrical with an axis of symmetry being the main center line C in an up-down direction view.

Furthermore, as illustrated in FIG. 4, within one battery mounting space BS, a predetermined number (however, a plurality. Four in this embodiment) of the first intermediate path portions 231 and 232 are provided in a group, and a predetermined number (however, a plurality. Four in this embodiment) of the second intermediate path portions 233 and 234 are provided in a group. For convenience of description, one group of the first intermediate path portions 231 and 232 and one group of the second intermediate path portions 233 and 234 provided in one battery mounting space BS are referred to as "first intermediate path portion group 235" and "second intermediate path portion group 236", respectively. In this way, within one battery mounting space BS, one first intermediate path portion group 235 and one second intermediate path portion group 236 are provided bilaterally symmetrically in relation to the main center line C. Then, a plurality of the first intermediate path portion groups 235 are provided in such a way as to be arranged in a front-rear direction, and a plurality of the second intermediate path portion groups 236 are also provided in such a way as to be arranged in a front-rear direction.

Each of the first intermediate path portions 231 and 232 included in one first intermediate path portion group 235 is in communication with the first central path portion 211 being the central path portion 21 at one end in a left-right direction (an end on a side near the main center line C, in other words, an end on a side near the central path portion 21). In other words, a plurality of the first intermediate path portions 231 and 232 branch toward outside (specifically, a right side) in a left-right direction from the first central path portion 211. The first intermediate path portions 231 and 232 included in one first intermediate path portion group 235 are in communication with each other by the first communication path portion 251 at another end in a left-right direction (an end on a side far from the main center line C, in other words, an end on a side near the first outer path portion 221), and in communication with the first outer path portion 221 through one first orifice portion 241. Therefore, it can also be said that "one first intermediate path portion group 235" is "a set of a plurality of the first intermediate path portions 231 and 232 being in communication via one first communication path portion 251".

Similarly, each of the second intermediate path portions 233 and 234 included in one second intermediate path portion group 236 is in communication with the second central path portion 212 at one end in a left-right direction (an end on a side near the main center line C, in other words, an end on a side near the central path portion 21). In other words, a plurality of the second intermediate path portions 233 and 234 branch toward outside (specifically, a left side) in a left-right direction from the second central path portion 212. The second intermediate path portions 233 and 234 included in one second intermediate path portion group 236 are in communication with each other by the second communication path portion 252 at another end in a left-right direction (an end on a side far from the main center line C, in other words, an end on a side near the second outer path portion 222), and in communication with the first outer path portion 221 through one second orifice portion 242. Therefore, it can also be said that "one second intermediate path portion group 236" is "a set of a plurality of the second intermediate path portions 233 and 234 being in communication via one second communication path portion 252".

According to the temperature adjustment path 20 having such a configuration, a temperature adjustment fluid that has flowed into a predetermined position between the first central path portion 211 and the second central path portion 212 (specifically, a place where the first central path portion 211 and the second central path portion 212 communicate with each other) from the first supply-discharge portion 112 flows toward a rear side through each of the first central path portion 211 and the second central path portion 212. Then, a temperature adjustment fluid flowing in the first central path portion 211 flows into each of the first intermediate path portions 231 and 232 of each of the first intermediate path portion groups 235. The temperature adjustment fluid that has passed through each of the first intermediate path portions 231 and 232 flows into the first outer path portion 221 through each of the first communication path portions 251 and each of the first orifice portions 241. Then, the temperature adjustment fluid that has flowed into the first outer path portion 221 flows frontward in the first outer path portion 221. Similarly, a temperature adjustment fluid flowing in the second central path portion 212 flows into each of the second intermediate path portions 233 and 234 of each of the second intermediate path portion groups 236. The temperature adjustment fluid that has passed through each of the second intermediate path portions 233 and 234 flows into the second outer path portion 222 through each of the second communication path portions 252 and each of the second orifice portions 242. Then, the temperature adjustment fluid that has flowed into the second outer path portion 222 flows frontward in the second outer path portion 222.

The temperature adjustment fluid that has flowed toward a front side in the first outer path portion 221 and the second outer path portion 222 is discharged to outside of the temperature adjustment path 20 (i.e., outside of the inner bottom plate portion) from the second supply-discharge portion 113 provided at a place where the first outer path portion 221 and the second outer path portion 222 communicate with each other. Then, the temperature adjustment fluid exchanges heat with the battery module 50 while flowing in the temperature adjustment path 20 (particularly, while flowing in each of the first intermediate path portions 231 and each of the second intermediate path portions 233). Thereby, a temperature of the battery module 50 is adjusted. Note that, the temperature adjustment path 20 can be used for both heating and cooling of the battery module 50.

Note that, a flow direction of a temperature adjustment fluid is not limited to the above direction, and may be an opposite direction to the above direction. Moreover, a flow direction of a temperature adjustment fluid may be alternately switched. For example, first, a temperature adjustment fluid is introduced into the temperature adjustment path 20 through the first supply-discharge portion 112. In this case, a temperature adjustment fluid flows in each of the first intermediate path portions 231 and 232 and each of the second intermediate path portions 233 and 234 toward both ends from a central portion of the battery mounting space BS. Thus, when the battery module 50 is cooled, the battery cells 501 positioned on both end sides of the battery module 50 in a longitudinal direction may be lower in temperature than the battery cell 501 positioned on a central portion side. Accordingly, when a temperature difference between the battery cell 501 in the central portion and the battery cells 501 positioned on both end sides has become equal to or more than a threshold value, a flow direction of a temperature adjustment fluid is reversed. That is to say, a temperature adjustment fluid is introduced into the temperature adjustment path 20 through the second supply-discharge portion 113. In this case, the temperature adjustment fluid flows in each of the first intermediate path portions 231 and 232 and each of the second intermediate path portions 233 and 234 toward the central portion from both ends of the battery mounting space BS. In this way, a flow direction of a temperature adjustment fluid is switched according to a temperature difference of the battery cells 501 included in the battery module 50. This can prevent or restrain a temperature of the battery module 50 from being uneven.

Such a configuration can pass a temperature adjustment fluid toward both ends from the central portion of the battery mounting space BS in a longitudinal direction by introducing the temperature adjustment fluid into the central path portion 21 (the first central path portion 211 and the second central path portion 212). Moreover, a temperature adjustment fluid can be passed toward the central portion from both ends of the battery mounting space BS in a longitudinal direction by introducing the temperature adjustment fluid into the first outer path portion 221 and the second outer path portion 222. This can prevent or restrain a temperature difference from being caused between both ends of the battery module 50 in a longitudinal direction. Further, since a path of a cooling medium becomes short as compared with a configuration that passes a temperature adjustment fluid from one end of the battery mounting space BS in a longitudinal direction toward another end, a temperature difference can be prevented or restrained from being caused between the central portion and both ends of the battery mounting space BS. Therefore, a temperature of the battery module 50 can be prevented or restrained from being uneven.

Furthermore, in this embodiment, two path portions being the first central path portion 211 and the second central path portion 212 are provided as the central path portion 21 in a central portion of each of the battery mounting spaces BS in a longitudinal direction. Then, the first central path portion 211 and each of the first intermediate path portions 231 are in communication, and the second central path portion 212 and each of the second intermediate path portions 233 are in communication. Such a configuration can prevent or restrain a difference from being made in amounts of temperature adjustment fluids flowing in the first intermediate path portion group 235 and the second intermediate path portion group 236 provided in the same one battery mounting space BS.

Specifically, as compared with a configuration in which one path portion is provided as the central path portion 21 passing through a central portion of each of the battery mounting spaces BS in a longitudinal direction, and the one path portion is in communication with both the first intermediate path portions 231 and 232 and the second intermediate path portions 233 and 234 (a configuration in which the first intermediate path portions 231 and 232 and the second intermediate path portions 233 and 234 branch from one path portion), a difference can be decreased between an amount of a temperature adjustment fluid flowing into a plurality of the first intermediate path portions 231 and 232 from the above-described one path portion and an amount of a temperature adjustment fluid flowing into a plurality of the second intermediate path portions 233 and 234 resulting from an inclination of the battery case 10 in a left-right direction (an inclination of a vehicle in which the battery case 10 is installed) or the like. As a result, an effect of preventing or restraining a difference in effects of temperature adjustment from being made between a part close to one end of the battery mounting space BS in a longitudinal direction and a part close to another end can be enhanced, and no temperature difference can be made between both ends of the battery module 50 in a longitudinal direction, or an effect of decreasing the temperature difference can be enhanced.

In this way, two path portions being the first central path portion 211 and the second central path portion 212 are provided in parallel as the central path portion 21, such that fluids to be introduced into the first central path portion 211 and the second central path portion 212 are even, and thereby a difference can be prevented or restrained from being made between an amount of a temperature adjustment fluid flowing in the first intermediate path portions 231 and 232 and an amount of a temperature adjustment fluid flowing in the second intermediate path portions 233 and 234. Therefore, an effect of preventing or restraining a temperature difference from being caused between a part close to one end of the battery module 50 in a longitudinal direction and a part close to another end can be enhanced.

Particularly, in this embodiment, the first central path portion 211 and the second central path portion 212 being the central path portion 21 are in communication with each other at one end in an extension direction, and the first supply-discharge portion 112 is provided at a place where the first central path portion 211 and the second central path portion 212 communicate with each other. With such a configuration, a temperature adjustment fluid that has flowed into the temperature adjustment path 20 from the first supply-discharge portion 112 substantially equally flows into the first central path portion 211 and the second central path portion 212 regardless of an inclination of the battery case 10 in a left-right direction or the like. As a result, since amounts of temperature adjustment fluids flowing in the first central path portion 211 and the second central path portion 212 can be even, a difference can be prevented or restrained from being made between an amount of a temperature adjustment fluid flowing in a plurality of the first intermediate path portions 231 and 232 positioned in the same one battery mounting space BS and an amount of a temperature adjustment fluid flowing in a plurality of the second intermediate path portions 233 and 234. Therefore, an effect of achieving evenness in a temperature distribution of the battery module 50 in a longitudinal direction can be enhanced.

Moreover, with a configuration in which two path portions being the first central path portion 211 and the second central path portion 212 are provided in the central portion of the heat sink 12 in a left-right direction, weight saving can be achieved while ensuring strength of a path portion, as compared with a configuration in which one path portion is provided. That is to say, with a configuration in which two path portions being the first central path portion 211 and the second central path portion 212 are formed substantially in parallel, the heat sink 12 and the lower panel 11 can be joined together between the first central path portion 211 and the second central path portion 212. Thus, as compared with a configuration in which one path portion that can pass a temperature adjustment fluid equal to that in two path portions being the first central path portion 211 and the second central path portion 212 is provided, an interval between joint places of the heat sink 12 and the lower panel 11 can be small. Further, since an erect-wall-shaped part is provided between the first central path portion 211 and the second central path portion 212, rigidity becomes high as compared with a simple flat-plate-shaped configuration. Therefore, rigidity of the central path portion 21 can be enhanced as compared with a configuration in which one path portion is provided.

A plurality of the first intermediate path portions 231 and 232 included in one first intermediate path portion group 235 extend in a left-right direction, and are arranged in a front-rear direction. Then, a plurality of the first intermediate path portions 231 and 232 are in communication with one another via the first communication path portions 251 at an outer end in a left-right direction (an end on a side near the first outer path portion 221), and in communication with the first outer path portion 221 through one first orifice portion 241. Similarly, a plurality of the second intermediate path portions 233 and 234 included in one second intermediate path portion group 236 extend in a left-right direction, and are arranged in a front-rear direction. Then, a plurality of the second intermediate path portions 233 and 234 are in communication with one another via the second communication path portion 252 at an outer end in a left-right direction (an end on a side near the second outer path portion 222), and in communication with the second outer path portion 222 through one second orifice portion 242.

Each of the first communication path portion 251 and the second communication path portion 252 is a path portion extending in a front-rear direction. Then, one side of the first communication path portion 251 in a left-right direction is connected to a plurality of the first intermediate path portions 231 and 232, and another side thereof is connected to the first outer path portion 221 via the first orifice portions 241. Similarly, one side of the second communication path portion 252 in a left-right direction is connected to a plurality of the second intermediate path portions 233 and 234, and another side thereof is connected to the second outer path portion 222 via the second orifice portion 242.

Such a configuration can prevent or restrain a variation in amounts of temperature adjustment fluids flowing in a plurality of the first intermediate path portions 231 and 232 included in one first intermediate path portion group 235, and a variation in amounts of temperature adjustment fluids flowing in a plurality of the second intermediate path portions 233 and 234 included in one second intermediate path portion group 236. That is to say, in a configuration in which each of a plurality of the first intermediate path portions 231 and 232 is independently in communication with the first outer path portion 221 via an orifice portion, a variation may be made in amounts of temperature adjustment fluids flowing in a plurality of the first intermediate path portions 231 and 232, due to processing accuracy of the orifice portion. The same also applies to a plurality of the second intermediate path portions 233 and 234. However, according to this embodiment, a variation in amount due to processing accuracy of the orifice portion is not caused, unevenness in a temperature of the battery module 50 can be prevented or restrained from being caused. Moreover, since management of dimensional accuracy of an orifice portion becomes easy as compared with a configuration in which one orifice portion is provided in one of the first intermediate path portions 231 and 232, and a configuration in which one orifice portion is provided in one of the second intermediate path portions 233 and 234, manufacturing cost can be reduced.

Note that flow path sectional areas of a plurality of the first orifice portions 241 (sectional areas of regions where a temperature adjustment fluid is permitted) are different from one another. Specifically, flow path sectional areas of a plurality of the first orifice portions 241 become larger farther from the first supply-discharge portion 112 and the second supply-discharge portion 113. Similarly, flow path sectional areas of a plurality of the second orifice portions 242 become larger farther from the first supply-discharge portion 112 and the second supply-discharge portion 113. In the example illustrated in FIG. 4, a flow path sectional area of a certain first orifice portion 241 is larger than a flow path sectional area of a first orifice portion 241 closer to a front side, and a flow path sectional area of a certain second orifice portion 242 is larger than a flow path sectional area of a second orifice portion 242 closer to a front side. A reason for providing such a configuration is as follows.

Temperature adjustment fluids flowing in the first central path portion 211, the second central path portion 212, the first outer path portion 221, and the second outer path portion 222 become lower in pressure due to pressure loss caused in each path portion farther away from the first supply-discharge portion 112 and the second supply-discharge portion 113. Thus, when flow path sectional areas of a plurality of the first orifice portions 241 and flow path sectional areas of a plurality of the second orifice portions 242 are the same, amounts of temperature adjustment fluids flowing in the first intermediate path portion group 235 and the second intermediate path portion group 236 become less farther away from the first supply-discharge portion 112 and the second supply-discharge portion 113. As a result, there is a concern that a difference is made between an effect of temperature adjustment for the battery module 50 stored at a position of the battery case 10 closer to front, and an effect of temperature adjustment for the battery module 50 stored at a position closer to rear. Specifically, an effect of temperature adjustment becomes low in the battery module 50 closer to a rear end.

In this embodiment, flow path sectional areas of a plurality of the first orifice portions 241 and a plurality of the second orifice portions 242 become larger farther from the first supply-discharge portion 112 and the second supply-discharge portion 113. In other words, pressure loss due to the first orifice portion 241 and the second orifice portion 242 is set to be greater nearer the first supply-discharge portion 112 and the second supply-discharge portion 113. With such a configuration, a difference of pressure loss due to distances from the first supply-discharge portion 112 and the second supply-discharge portion 113 can be offset by a difference of pressure loss between the first orifice portion 241 and the second orifice portion 242. Therefore, a difference can be prevented or restrained from being made in amounts of temperature adjustment fluids flowing in each of the first intermediate path portion groups 235 and each of the second intermediate path portion groups 236.

However, path sectional areas of the first orifice portion 241 and the second orifice portion 242 included in the same one battery mounting space BS are the same. Such a configuration can prevent or restrain a difference from being made in amounts of temperature adjustment fluids flowing in the first intermediate path portion group 235 and the second intermediate path portion group 236 provided in the same one battery mounting space BS.

Figure 5:
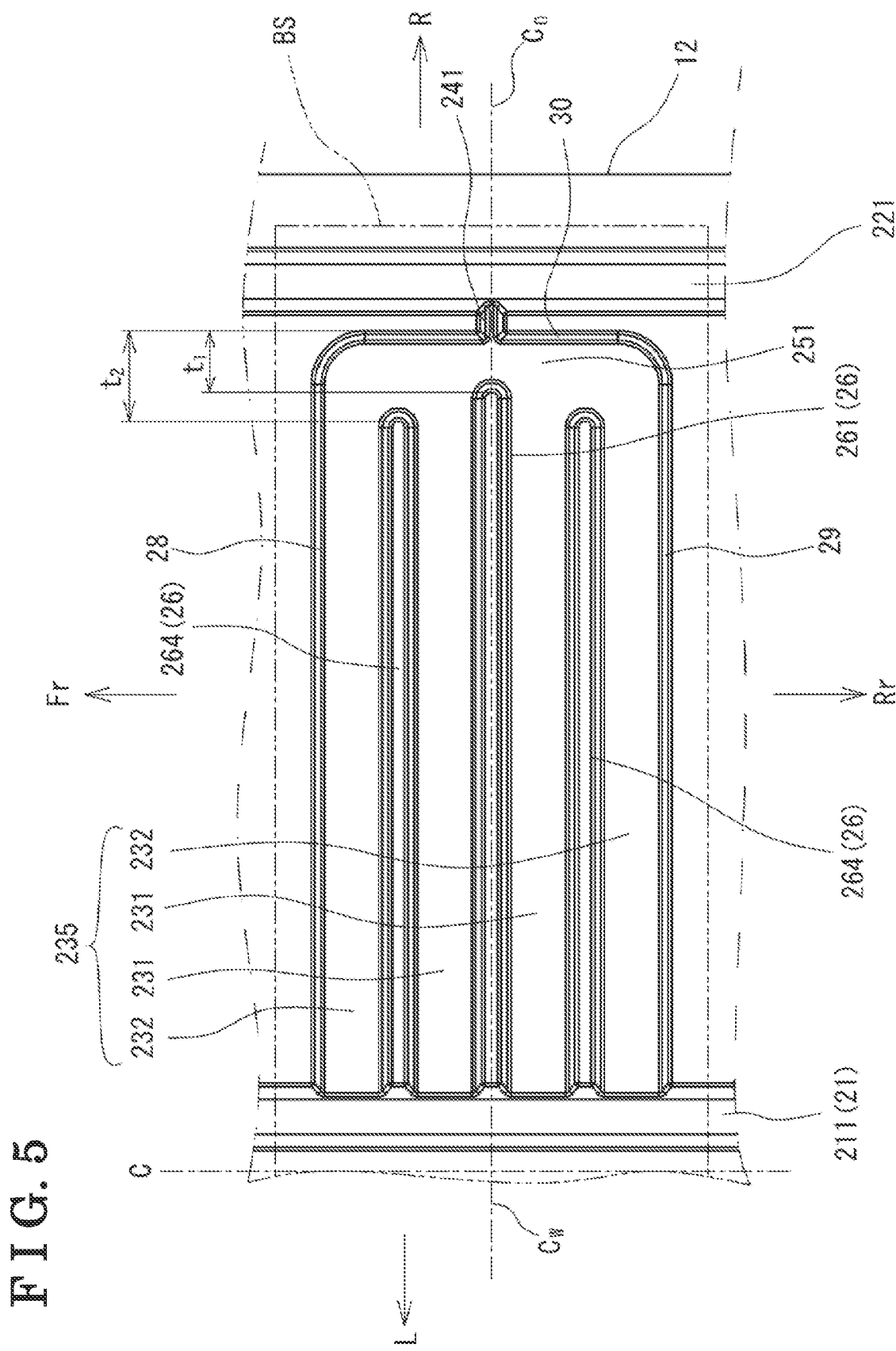
FIG. 5 is a plan view illustrating a configuration of a first intermediate path portion.
Figure 6:
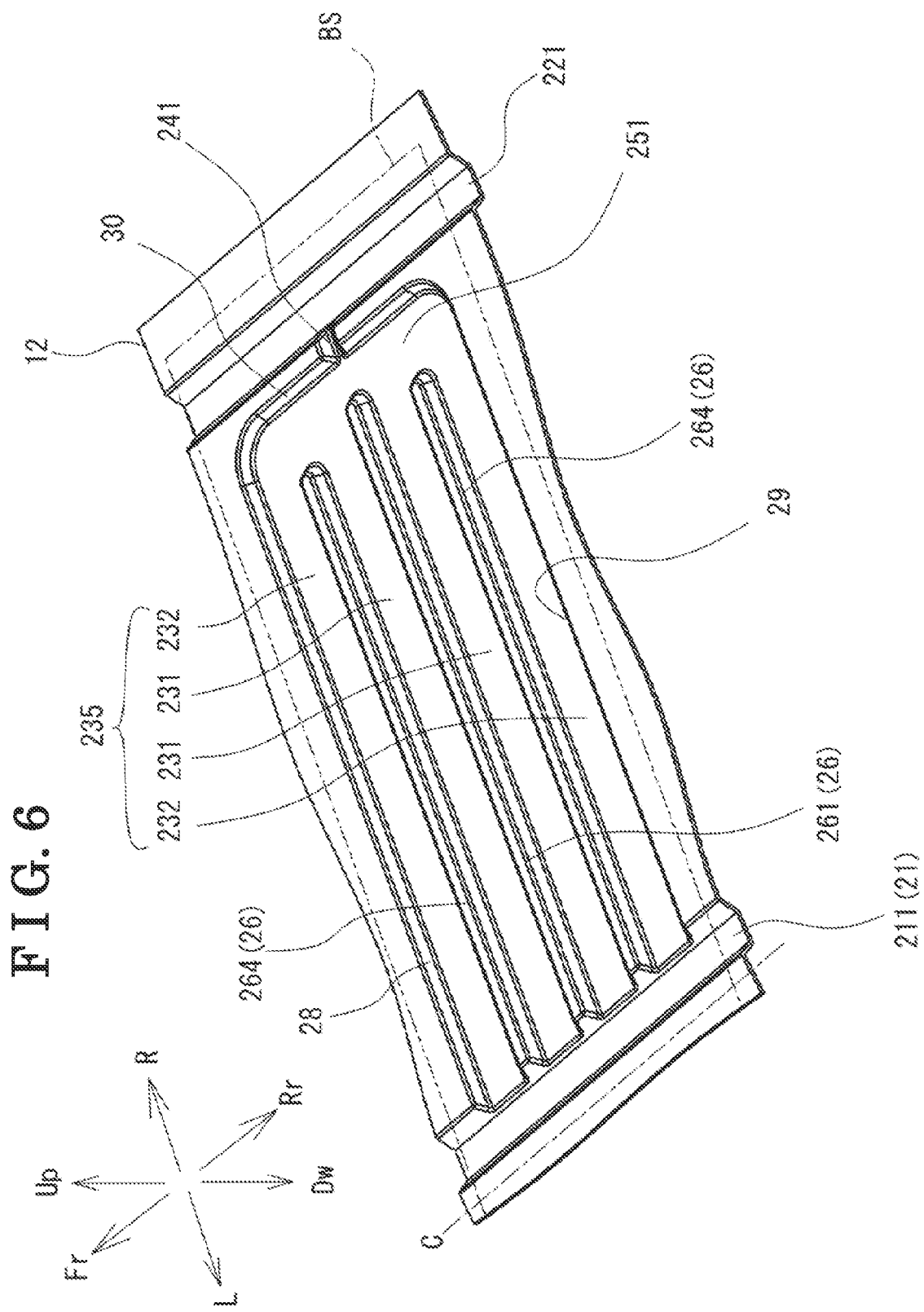
FIG. 6 is a perspective view illustrating the configuration of the first intermediate path portion.

FIG. 5 is a plan view of one first intermediate path portion group 235, and FIG. 6 is a perspective view of one first intermediate path portion group 235. As illustrated in FIGS. 5 and 6, in this embodiment, four first intermediate path portions 231 and 232 are included in one first intermediate path portion group 235. The four first intermediate path portions 231 extend in a left-right direction, and are arranged in a front-rear direction. Moreover, the four first intermediate path portions 231 are parallel to one another. Then, the four first intermediate path portion groups 235 are partitioned by three first partition wall portions 26. The three first partition wall portions 26 extend in a left-right direction, and are arranged in a front-rear direction. Moreover, the three first partition wall portions 26 are parallel to one another. Similarly, four second intermediate path portions 233 and 234 are included in one second intermediate path portion group 236. The four second intermediate path portions 233 and 234 extend in a left-right direction, and are arranged in a front-rear direction. Moreover, the four second intermediate path portions 233 and 234 are parallel to one another. Then, the four second intermediate path portion groups 236 are partitioned by three second partition wall portions 27. The three second partition wall portions 27 extend in a left-right direction, and are arranged in a front-rear direction. Moreover, the three second partition wall portions 27 are parallel to one another (see FIGS. 3 and 4).

In other words, a space that is surrounded by erect wall portions (a front wall portion 28 located on a front side, a rear wall portion 29 located on a rear side, and a side wall portion 30 located on a side near the first outer path portion 221) in three directions on sides being a front side, a rear side, and one side in a left-right direction and being sides near the first outer path portion 221, and that is connected (open) to the first central path portion 211 on a side near the first central path portion 211 is provided between the first central path portion 211 (the central path portion 21) and the first outer path portion 221 and within one battery mounting space BS. The three first partition wall portions 26 arranged apart from one another in a front-rear direction and extending in a left-right direction are provided inside the space.

One end (an end on a side near the first central path portion 211) of each of the three first partition wall portions 26 in a left-right direction (longitudinal direction) is integrally connected to the path wall portion 122 forming the first central path portion 211. On the contrary, another end (an end on a side near the first outer path portion 221) of each of the three first partition wall portions 26 in a left-right direction is apart from the erect wall portion (the side wall portion 30). Thus, a temperature adjustment fluid is circulatable between the another end of each of the three first partition wall portions 26 and the erect wall portion (the side wall portion 30). That is to say, the first communication path portion 251 that brings the four first intermediate path portions 231 and 232 into communication with one another is formed by the another end of each of the three first partition wall portions 26 and the erect wall portion (the side wall portion 30). Moreover, the first orifice portion 241 that brings the first communication path portion 251 and the first outer path portion 221 into communication is provided in the erect wall portion (the side wall portion 30).

Then, as illustrated in FIGS. 5 and 6, in a left-right direction view, the first orifice portion 241 faces one first partition wall portion 261 positioned in a center in a front-rear direction among the three first partition wall portions 26. In other words, a center line $C_O$ of a flow path of the first orifice portion 241 corresponds to a center line $C_W$ of the one first partition wall portion 261 positioned in a center in a front-rear direction among the three first partition wall portions 26.

Such a configuration can prevent or restrain a difference from being made in amounts of temperature adjustment fluids flowing in a plurality of the first intermediate path portions 231 and 232 connected to one first orifice portion 241. Specifically, with a configuration in which the first orifice portion 241 is superposed over one of a plurality of the first intermediate path portions 231 and 232 in a left-right direction view, when a temperature adjustment fluid flows from a side of the first orifice portion 241, the temperature adjustment fluid that has passed through the first orifice portion 241 flows into the one first intermediate path portion without losing momentum. Moreover, even when a temperature adjustment fluid flows from a side of the first central path portion 211, resistance of a flow of the temperature adjustment fluid differs between one first intermediate path portion superposed over the first orifice portion 241 and another first intermediate path portion that is not superposed.

That is to say, while a temperature adjustment fluid that has flowed in one first intermediate path portion superposed over the first orifice portion 241 flows into the first orifice portion 241 without changing a flow direction, a temperature adjustment fluid that has flowed in another first intermediate path portion that is not superposed over the first orifice portion 241 changes a flow direction when flowing into the first orifice portion 241. Thus, an amount of a temperature adjustment fluid flowing in one first intermediate path portion superposed over the first orifice portion 241 tends to be larger than an amount of a temperature adjustment fluid flowing in another first intermediate path portion that is not superposed over the first orifice portion 241. Therefore, a difference is made in amounts of temperature adjustment fluids flowing in a plurality of the first intermediate path portions 231, and as a result, a temperature distribution of the battery module 50 may become uneven.

In contrast, according to this embodiment, temperature adjustment fluids that have flowed toward a plurality of the first intermediate path portions 231 and 232 from a side of the first orifice portion 241 do not flow directly into one of the first intermediate path portions 231 and 232, but collide with one first partition wall portion 261, and lose momentum. Moreover, each temperature adjustment fluid that has flowed into each of the first intermediate path portions 231 and 232 from a side of the first central path portion 211 changes a flow direction when flowing into the first orifice portion 241. Thus, a difference can be prevented or restrained from being made in amounts of temperature adjustment fluids flowing in a plurality of the first intermediate path portions 231 and 232.

Furthermore, as illustrated in FIGS. 5 and 6, a distance $t_1$ between an end of one first partition wall portion 261 positioned in a center in a front-rear direction among the three first partition wall portions 26 and the erect wall portion (the side wall portion 30) is smaller than a distance $t_2$ between an end of each of first partition wall portions 264 positioned on both sides in a front-rear direction and the erect wall portion (the side wall portion 30). That is to say, a flow path sectional area of the first communication path portion 251 becomes larger farther away from the first orifice portion 241 in a front-rear direction.

Such a configuration can prevent or restrain a difference from being made in amounts of temperature adjustment fluids flowing in a plurality of the first intermediate path portions 231 and 232 connected to one first orifice portion 241 via the first communication path portion 251. Specifically, since pressure loss of a temperature adjustment fluid flowing in the first communication path portion 251 becomes greater farther away from the first orifice portion 241 in a front-rear direction, an amount of a temperature adjustment fluid flowing in the first intermediate path portion 232 far from the first orifice portion 241 (specifically, two first intermediate path portions 232 positioned at both ends, in a front-rear direction, of the four first intermediate path portions 231 and 232) becomes less than an amount of a temperature adjustment fluid flowing in the first intermediate path portion 231 close to the first orifice portion 241 (specifically, two first intermediate path portions 232 positioned in a center in a front-rear direction among the four first intermediate path portions 231 and 232), with a configuration that cannot provide a difference in a size of a flow path sectional area of the first communication path portion 251.

In contrast, according to this embodiment, since a flow path sectional area of the first communication path portion 251 is set to be larger farther away from the first orifice portion 241, pressure loss of a temperature adjustment fluid flowing in the first intermediate path portion 232 far from the first orifice portion 241 is lessened. In other words, in the first communication path portion 251, an end of the first partition wall portion 264 (the first partition wall portions 264 positioned at both ends in a front-rear direction) existing between the first orifice portion 241 and the far first intermediate path portion 232 can be prevented or restrained from becoming resistance for a temperature adjustment fluid flowing between the first orifice portion 241 and the far first intermediate path portion 232. This can prevent or restrain an amount of a temperature adjustment fluid flowing in the first intermediate path portion 232 far from the first orifice portion 241 from becoming less than an amount of a fluid flowing in the first intermediate path portion 231 near the first orifice portion 241. Note that, specific values of the distances $t_1$, $t_2$ and a difference between the distances $t_1$, $t_2$ are not particularly limited, and are suitably set.

Moreover, in this embodiment, the four first intermediate path portions 231 and 232 are included in one first intermediate path portion group 235. Thus, the three first partition wall portions 26 are provided between the first central path portion 211 and the first outer path portion 221. Then, in a left-right direction view, the first orifice portion 241 is superposed over one first partition wall portion 261 positioned in a center in a front-rear direction among the three first partition wall portions 26. With such a configuration, since a plurality of the first intermediate path portions 231 are positioned symmetrically in a front-rear direction relative to the center lines $C_O$, $C_W$ of the first orifice portion 241 and the central first partition wall portion 261, distances from the first orifice portion 241 up to the two central first intermediate path portions 231 become the same, and a distance from the first orifice portion 241 up to the first intermediate path portion 232 positioned on a frontmost side and a distance up to the first intermediate path portion 232 positioned on a rearmost side become the same, Therefore, a difference can be prevented or restrained from being made in amounts of temperature adjustment fluids flowing in the two central first intermediate path portions 231, and a difference can be prevented or restrained from being made in amounts of temperature adjustment fluids flowing in the two first intermediate path portions 232 positioned at front and rear ends.

Note that, the second intermediate path portion group 236, the second communication path portion 252, the second partition wall portion 27, and the second orifice portion 242 have configurations bilaterally symmetrical to the first intermediate path portion group 235, the first communication path portion 251, the first partition wall portion 26, and the first orifice portion 241. That is to say, as illustrated in FIG. 4, a plurality of the second intermediate path portions 233 and 234 are partitioned by a plurality of the second partition wall portions 27. Ends of a plurality of the second intermediate path portions 233 and 234 on a side near the second outer path portion 222 are in communication by the second communication path portion 252 extending in a front-rear direction. Further, one second partition wall portion 271 positioned in a center in a front-rear direction among a plurality of the second partition wall portions 27 is superposed over the second orifice portion 242 in a left-right direction view. Moreover, an end of another second partition wall portion 274 other than the one second partition wall portion 271 on a side near the second orifice portion 242 is positioned on a side (a side far from the second orifice portion 242) nearer the central path portion 21 than the one second partition wall portion 271. Therefore, the second intermediate path portion group 236, the second communication path portion 252, the second partition wall portion 27, and the second orifice portion 242 provide the same advantageous effect as the first intermediate path portion group 235, the first communication path portion 251, the first partition wall portion 26, and the first orifice portion 241.

Note that, in this embodiment, a plurality of the first intermediate path portions 231 and 232 included in one first intermediate path portion group 235 are parallel to one another. Similarly, a plurality of the second intermediate path portions 233 and 234 included in one second intermediate path portion group 236 are parallel to one another. However, a plurality of the first intermediate path portions 231 and 232 may not be parallel to one another. Similarly, a plurality of the second intermediate path portions 233 and 234 may not be parallel to one another. For example, center lines of a plurality of the first intermediate path portions 231 and 232 included in one first intermediate path portion group 235 may be inclined relative to one another. Similarly, center lines of a plurality of the second intermediate path portions 233 and 234 may be inclined relative to one another. Moreover, a center line of each of a plurality of the first intermediate path portions 231 and 232 and a center line of each of a plurality of the second intermediate path portions 233 and 234 may not be straight lines.

Moreover, in this embodiment, the first supply-discharge portion 112 and the second supply-discharge portion 113 are provided in the extension portion 111 of the lower panel 11, and positioned on a front side (i.e., an outer peripheral side of the frame body) of the front frame 13. With such a configuration, since an occupancy area of the battery mounting space BS on an inner peripheral side of the frame body (a region surrounded by the frame body) can be large, battery energy density including the battery case 10 can be enhanced. Moreover, since a pipe for discharging can be connected to a pipe for introducing a temperature adjustment fluid on one side of the battery case 10, a degree of freedom in pipe layout in a vehicle is improved.

Furthermore, an inner bottom plate portion is formed by the stacked body of the lower panel 11 and the heat sink 12. Then, the lower panel 11 and the heat sink 12 are each made of an aluminum plate, and molded by press working. With such a configuration, since a temperature adjustment fluid directly contacts a lower surface of the lower panel 11, a heat exchange amount between the battery module 50 and the temperature adjustment fluid can be large. Therefore, an effect of temperature adjustment of the battery module 50 can be enhanced.

Moreover, the path wall portion 122 of the heat sink 12 is also molded by press working. With such a configuration, since weight saving of an inner bottom plate portion can be achieved, density of battery energy in a configuration including the battery case 10 can be enhanced. That is to say, with a configuration in which the path wall portion 122 is molded by press working, the heat sink 12 can be thin, and therefore weight saving of the heat sink 12 can be achieved, as compared with, for example, a configuration in which the path wall portion 122 is molded by cutting work (a groove is cut by cutting work).

Figure 7:
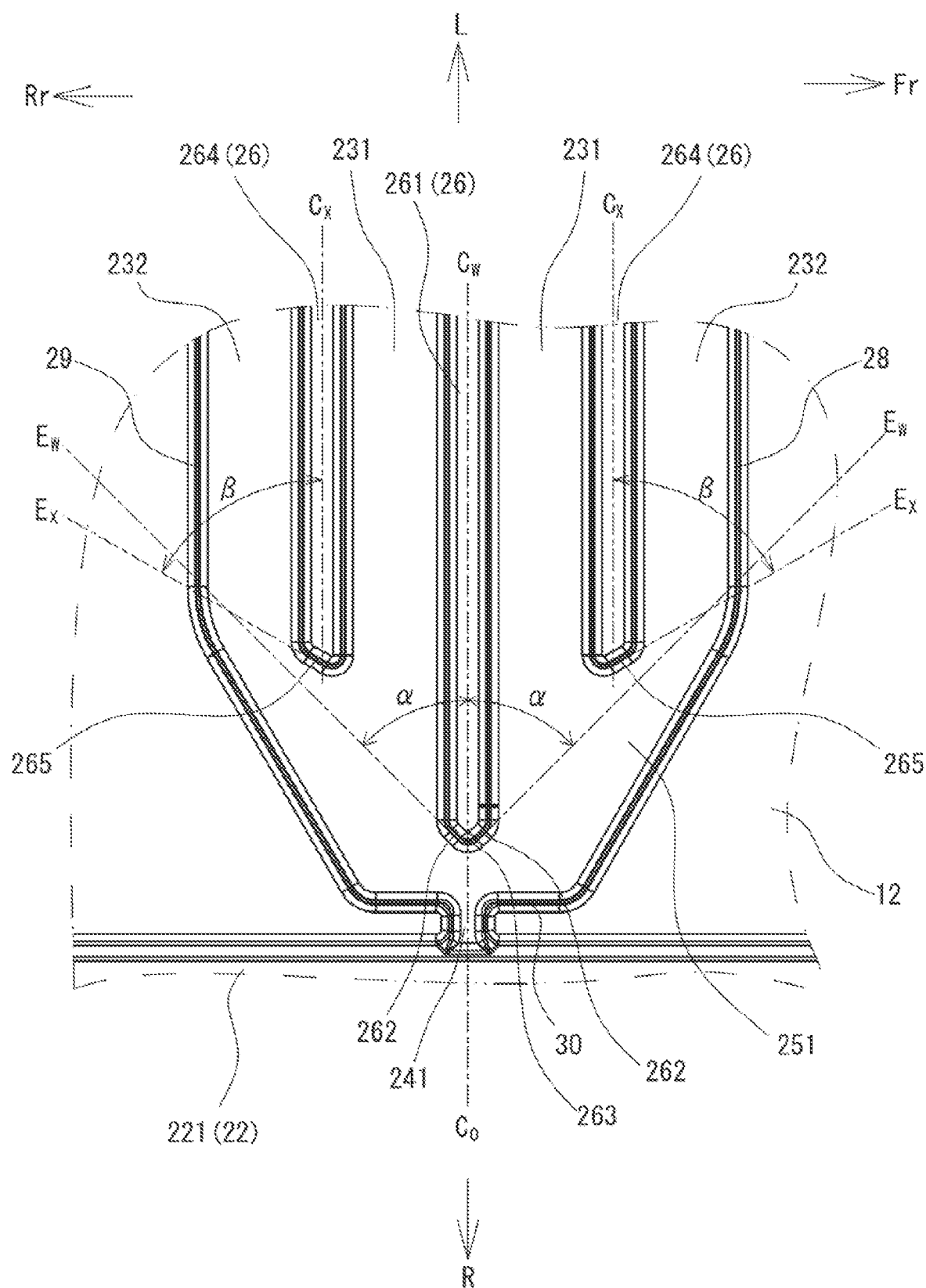
FIG. 7 is a plan view illustrating a configuration of a first intermediate path portion according to a modified example.

Next, an example (modified example) in which a difference in amounts of temperature adjustment fluids flowing in a plurality of the first intermediate path portions 231 and 232 included in one first intermediate path portion group 235 is described. FIG. 7 is a plan view illustrating a configuration of the first intermediate path portion group 235 and the first partition wall portion 26 according to the modified example. As illustrated in FIG. 7, a plurality of (four in this embodiment) the first intermediate path portions 231 and 232 are included in one first intermediate path portion group 235, and a plurality of the first intermediate path portion groups 235 are partitioned by a plurality of (three in this embodiment) the first partition wall portions 26 provided to be arranged in a front-rear direction.

As illustrated in FIG. 7, one particular first partition wall portion 261 among a plurality of the first partition wall portions 26 is superposed over the first orifice portion 241 in a left-right direction view. More specifically, the center line $C_O$ of the first orifice portion 241 substantially corresponds to the center line $C_W$ of the one particular first partition wall portion 261. In this embodiment, among a plurality of the first partition wall portions 26 parallel to one another included in one battery mounting space BS, one first partition wall portion 261 positioned in a center in a front-rear direction is "one particular first partition wall portion 261". The one particular first partition wall portion is referred to as "particular first partition wall portion 261".

An end of the particular first partition wall portion 261 on a side near the first orifice portion 241 has a tapered shape that gradually becomes smaller in width dimension (dimension in a front-rear direction) toward the first orifice portion 241 in an up-down direction view. Specifically, two inclined surfaces 262 inclined at a predetermined angle relative to the center line $C_W$ of the particular first partition wall portion 261 in a front-rear direction (in a width direction) in an up-down direction view (i.e., inclined relative to both a left-right direction and a front-rear direction) are provided at an end of the particular first partition wall portion 261 symmetrically to each other in relation to the center line $C_W$. The two inclined surfaces 262 are an example of a particular first inclined surface of this disclosure. The two inclined surfaces 262 (particular first inclined surface) are each inclined in such a way that a distance from the first orifice portion 241 becomes larger farther away from a center (i.e. the center line $C_W$) of the particular first partition wall portion 261 in a front-rear direction to each of front and rear sides in a front-rear direction in an up-down direction view. Then, a curved surface 263 (arc-shaped surface) having a predetermined curvature radius in an up-down direction view is provided between the two inclined surfaces 262. In other words, the two inclined surfaces 262 are smoothly connected by the arc-shaped curved surface 263 provided therebetween. Thus, an end of the particular first partition wall portion 261 has a shape symmetrical (mirror-symmetrical) in relation to the center line $C_W$, a center in a front-rear direction is nearest the first orifice portion 241, and both ends in a front-rear direction are farthest from the first orifice portion 241.

As illustrated in FIG. 7, an end of the first partition wall portion 264 other than the particular first partition wall portion 261 on a side near the first orifice portion 241 is positioned on a side nearer the central path portion 21 than an end of the particular first partition wall portion 261 on a side near the first orifice portion 241. The first partition wall portion 264 other than the particular first partition wall portion 261 may be referred to as "another first partition wall portion 264". An end of the another first partition wall portion 264 on a side near the first orifice portion 241 (an end on a side near the first outer path portion 221) is positioned on a side nearer the central path portion 21 (on a side farther from the first orifice portion 241) than an extension line $E_W$ (note that, the extension line $E_W$ is actually a surface) of the inclined surface 262 being one of the two inclined surfaces 262 provided in the particular first partition wall portion 261 and being positioned on a side near the another first partition wall portion 264 in an up-down direction view. In other words, in an up-down direction view, an end of the another first partition wall portion 264 on a side near the central path portion 21 does not protrude on a side of the first orifice portion 241 from the extension line $E_W$ of the inclined surface 262 (an extension surface of the inclined surface 262) located on a side near the another first partition wall portion 264 among the two inclined surfaces 262 of the particular first partition wall portion 261.

An end of the another first partition wall portion 264 on a side near the first orifice portion 241 also has a tapered shape that gradually becomes smaller in width dimension (dimension in a front-rear direction) toward the first orifice portion 241 in an up-down direction view. Specifically, one inclined surface 265 inclined at a predetermined angle β relative to a center line $C_X$ of the another first partition wall portion 264 (i.e., inclined relative to both a left-right direction and a front-rear direction) in an up-down direction is provided at an end of the another first partition wall portion 264 on a side near the first orifice portion 241 (a one-point chain line $E_X$ in FIG. 7 is an extension line of the inclined surface 265). The one inclined surface is an example of a first inclined surface of this disclosure. In other words, an end face of the another first partition wall portion 264 on a side near the first orifice portion 241 is the inclined surface 265 inclined at the predetermined angle β relative to the center line $C_X$ of the another first partition wall portion 264. Then, the inclined surface 265 is inclined in such a direction that a distance from the first orifice portion 241 becomes larger from a center on a side surface near the particular first partition wall portion 261 included in the same one battery mounting space (one surface in a front-rear direction) toward a side surface on an opposite side (side far from the particular first partition wall portion 261).

Such a configuration can enhance an effect of preventing or restraining a difference from being made in amounts of temperature adjustment fluids flowing in a plurality of the first intermediate path portions 231 and 232 connected to the one first orifice portion 241. Specifically, a temperature adjustment fluid that has flowed in the first communication path portion 251 through the one first orifice portion 241 collides with an end of the particular first partition wall portion 261. Since the inclined surface 262 and the arc-shaped curved surface 263 as described above are provided at an end of the particular first partition wall portion 261, a temperature adjustment fluid is divided to both front and rear sides by the two inclined surfaces 262 of the particular first partition wall portion 261, and each of flow directions of divided temperature adjustment fluids is changed into a direction substantially parallel to the inclined surface 262. Thus, a temperature adjustment fluid can be passed toward the two first intermediate path portions 232 (the first intermediate path portions 232 far from the first orifice portion 241) provided at both ends, in a front-rear direction, of each of the four first intermediate path portions 231 and 232 included in one first intermediate path portion group 235. Therefore, since amounts of temperature adjustment fluids flowing into the two first intermediate path portions 232 can be increased, an effect of preventing or restraining amounts of temperature adjustment fluids flowing into the two first intermediate path portions 232 from becoming less than amounts of temperature adjustment fluids flowing into the two first intermediate path portions 231 (the first intermediate path portions 231 near the first orifice portion 241) positioned in a center in a front-rear direction can be enhanced.

Furthermore, an end (the inclined surface 265) of the another first partition wall portion 264 is located on a side nearer the central path portion 21 than the extension line $E_W$ of the inclined surface 262 at an end of the particular first partition wall portion 261. Such a configuration can prevent or restrain an end of the another first partition wall portion 264 from becoming resistance of a flow of a temperature adjustment fluid induced by the inclined surface 262 provided at an end of the particular first partition wall portion 261. Therefore, an effect of preventing or restraining amounts of temperature adjustment fluids flowing into the two first intermediate path portions 231 positioned at both ends in a front-rear direction from becoming less than amounts of temperature adjustment fluids flowing into the two first intermediate path portions 231 positioned therebetween can be enhanced.

Note that, an angle α formed by the center line $C_W$ and the inclined surface 262 in an up-down direction view is preferably 45° to 60°. That is to say, when the angle α is less than 45°, a path for a temperature adjustment fluid divided at an end of the particular first partition wall portion 261 to reach an end of the another first partition wall portion 264 (in other words, the first intermediate path portions 232 on both front and rear end sides) becomes long, and irregularity tends to be caused in a flow volume distribution of a peripheral portion (the first intermediate path portions 232 on both front and rear end sides). On the other hand, when the angle is more than 60°, a disturbance tends to be caused in a flow of a temperature adjustment fluid at collision of a temperature adjustment fluid with an end of the particular first partition wall portion 261, and an effect of equalizing a flow volume is restrained. Moreover, in an up-down direction view, the angle β of the inclined surface 265 relative to the center line $C_X$ is preferably 45° to 60°. When the angle β is less than 45°, irregularity tends to be caused in a distribution of flow volume of a temperature adjustment fluid in a peripheral portion (the first intermediate path portions 232 on both front and rear end sides). When the angle β is more than 60°, a disturbance tends to be caused in a flow of a temperature adjustment fluid at collision of the temperature adjustment fluid, and irregularity tends to be caused in a distribution of flow volume of a temperature adjustment fluid in a peripheral portion. Note that, the inclined surface 265 may be substantially parallel to the inclined surface 262 of the particular first partition wall portion 261. Moreover, a curvature radius of the curved surface 263 connecting the two inclined surfaces 262 in an up-down direction view is preferably 0.5 mm to 2.5 mm. That is to say, when the curvature radius is less than 0.5 mm, there is a concern that joint strength at a tip portion weakens, whereas when the curvature radius is more than 2.5 mm, a tip becomes near a planar shape, and therefore, a disturbance tends to be caused in a flow of a temperature adjustment fluid when the temperature adjustment fluid collides with the tip portion, and irregularity tends to be caused in a distribution of flow volume in a peripheral portion.

Furthermore, at an end of each of the first intermediate path portions 231 and 232 on a side near the first orifice portion 241, an interval between the front wall portion 28 and the rear wall portion 29 gradually becomes smaller nearer the first orifice portion 241. In other words, the side wall portion 30 is inclined with a predetermined angle in such a way as not to be perpendicular to the center line $C_O$ of the first orifice portion 241 but to become nearer the central path portion 21 farther away from the first orifice portion 241 in a front-rear direction. Again, In other words, vicinities of ends of the front wall portion 28 and the rear wall portion 29 on a side near the first orifice portion 241, and the side wall portion 30 each have such a funnel-like shape as to converge toward the first orifice portion 241 in an up-down direction view.

With such a configuration, a temperature adjustment fluid that has flowed into the first communication path portion 251 from the first orifice portion 241 and has been divided into front and rear at an end of the particular first partition wall portion 261 is smoothly guided to the first intermediate path portion 232 positioned at both front and rear ends by the front wall portion 28, the rear wall portion 29, and the side wall portion 30. Moreover, a temperature adjustment fluid that has flowed into each of the first intermediate path portions 231 and 232 from the first central path portion 211 and has passed through each of the first intermediate path portions 231 and 232 is smoothly guided to the first orifice portion 241 by the front wall portion 28, the rear wall portion 29, and the side wall portion 30. Therefore, flow resistance of a temperature adjustment fluid can be diminished, and retention of a temperature adjustment fluid in the first communication path portion 251 can be prevented or restrained.

Note that, a plurality of the second partition wall portions 27 included in one battery mounting space BS have a configuration bilaterally symmetrical to a plurality of the first partition wall portions 26 included in the same one battery mounting space in relation to the main center line C. Thus, two inclined surfaces are symmetrically provided, and a curved surface smoothly connecting the two inclined surfaces is provided, at an end, on a side near the second orifice portion 242, of the one second partition wall portion 271 (see FIG. 4) positioned in a center in a front-rear direction among a plurality of the second partition wall portions 27 included in one battery mounting space BS. Note that, the one second partition wall portion 271 positioned in a center in a front-rear direction among a plurality of the second partition wall portions 27 included in one battery mounting space BS is an example of a particular second partition wall portion of this disclosure, and two inclined surfaces provided in the second partition wall portion 271 are an example of a particular second inclined surface of this disclosure. Thus, an end, on a side near the second orifice portion 242, of the one second partition wall portion 271 (particular second partition wall portion) positioned in a center in a front-rear direction among a plurality of the first partition wall portions 26 included in the same one battery mounting space has a tapered shape that becomes smaller in dimension in a front-rear direction nearer the second orifice portion 242, similarly to an end of the particular first partition wall portion 261 on a side near the first orifice portion 241.

Similarly, an end, on a side near the second orifice portion 242, of the second partition wall portion 274 other than the one second partition wall portion 271 positioned in a center in a front-rear direction among a plurality of the second partition wall portions 27 included in one battery mounting space BS also has a tapered shape that gradually becomes smaller in dimension in a front-rear direction toward the second orifice portion 242 in an up-down direction view. Specifically, one inclined surface inclined at the predetermined angle s relative to a center line of the second partition wall portion 274 (i.e., inclined relative to both a left-right direction and a front-rear direction) in an up-down direction view is provided at an end of the second partition wall portion 274 on a side near the second orifice portion 242. The one inclined surface is an example of a second inclined surface of this disclosure. The inclined surface is inclined in such a direction that a distance from the second orifice portion 242 becomes larger from a side surface (one surface in a front-rear direction) on a side near the one second partition wall portion 271 positioned in a center in a front-rear direction among a plurality of the second partition wall portions 27 included in one battery mounting space BS toward a side surface on an opposite side (side far from the second partition wall portion 271).

Thus, a plurality of the second partition wall portions 27 included in one battery mounting space BS provide the same advantageous effect as a plurality of the first partition wall portions 26 included in the same one battery mounting space.

While the embodiment of this disclosure has been described above, this disclosure is not limited to the embodiment described above.

For example, the embodiment described above has disclosed a configuration in which the central path portion 21 includes two path portions being the first central path portion 211 and the second central path portion 212, but this disclosure is not limited to such a configuration. For example, the central path portion 21 may have a configuration including one path portion. In this case, a plurality of the first intermediate path portions 231 and a plurality of the second intermediate path portions 233 each branch to an opposite side in a left-right direction from one path portion being the central path portion 21.

Moreover, the embodiment described above has disclosed a configuration in which one end of each of a plurality of the first intermediate path portions 231 and 232 included in each of the first intermediate path portion groups 235 is in communication with the first central path portion 211, and other ends are in communication with one another and in communication with the first outer path portion 221 via the first orifice portion 241, but this disclosure is not limited to such a configuration. This disclosure may provide a configuration in which one end of each of a plurality of the first intermediate path portions 231 and 232 included in each of the first intermediate path portion groups 235 is in communication with the first central path portion 211, and other ends are in communication with one another and in communication with the first outer path portion 221 via an orifice portion. Similarly, this disclosure may provide a configuration in which one end of each of a plurality of the second intermediate path portions 233 and 234 included in each of the second intermediate path portion groups 236 is in communication with the second outer path portion 222, and other ends are in communication with one another and in communication with the second central path portion 212 via an orifice portion.

In short, a plurality of the first intermediate path portions 231 and 232 included in one first intermediate path portion group 235 may be in communication at one end with one of the first central path portion 211 and the first outer path portion 221, and in communication at another end with each other, and may be in communication with another of the first central path portion 211 and the first outer path portion 221 via the first orifice portion 241, respectively. Similarly, a plurality of the second intermediate path portions 233 and 234 included in one second intermediate path portion group 236 may be in communication at one end with one of the second central path portion 212 and the second outer path portion 222, and in communication at another end with each other, and may be in communication with another of the second central path portion 212 and the second outer path portion 222 via the second orifice portion 242, respectively.

Moreover, the number of the first intermediate path portions 231 and 232 included in each of the first intermediate path portion groups 235, and the number of the second intermediate path portions 233 and 234 included in each of the second intermediate path portion groups 236 are not limited to four disclosed in the embodiment described above. For example, the number of the first intermediate path portions 231 and 232 included in each of the first intermediate path portion groups 235, and the number of the second intermediate path portions 233 and 234 included in each of the second intermediate path portion groups 236 may be equal to or less than three, or may be equal to or more than five. However, it is preferable that a plurality of the first intermediate path portions 231 and 232 included in each of the first intermediate path portion groups 235 are provided symmetrically in a front-rear direction with respect to the first orifice portion 241, and the first orifice portion 241 is superposed over the first partition wall portion 261 in a left-right direction view. Thus, the number of the first intermediate path portions 231 and 232 included in each of the first intermediate path portion groups 235 is preferably an even number. For a similar reason, the number of the second intermediate path portions 233 and 234 included in each of the second intermediate path portion groups 236 is also preferably an even number.

Note that, when the number of the first intermediate path portions 231 and 232 included in each of the first intermediate path portion groups 235 and the number of the second intermediate path portions 233 and 234 included in each of the second intermediate path portion groups 236 are two, each of the first partition wall portion 26 and the second partition wall portion 27 is singular. Then, in this case, in a left-right direction view, the first orifice portion 241 is superposed over the one first partition wall portion 26, and the second orifice portion 242 is superposed over the one second partition wall portion 27.

Moreover, the embodiment described above has disclosed an example in which a center of the battery mounting space BS in a longitudinal direction corresponds to a center of the heat sink 12 in a left-right direction, but this disclosure is not limited to such a configuration. A center of the battery mounting space BS in a longitudinal direction may be out of alignment with a center of the heat sink 12 in a left-right direction. Further, an interval between the first central path portion 211 and the first outer path portion 221 and an interval between the second central path portion 212 and the second outer path portion 222 may not be the same, and may be different.

Moreover, the embodiment described above has disclosed an example in which one first intermediate path portion group 235 and one second intermediate path portion group 236 are provided in one battery mounting space BS, but this disclosure is not limited to such a configuration. For example, parts of the first intermediate path portions 231 and 232 included in the first intermediate path portion group 235 may be located outside of the battery mounting space BS. Similarly, parts of the second intermediate path portions 233 and 234 included in the second intermediate path portion group 236 may be located outside of the battery mounting space BS. Otherwise, a plurality of the first intermediate path portion groups 235 and a plurality of the second intermediate path portion groups 236 may be provided in one battery mounting space BS. Further, when a plurality of the first intermediate path portions 231 connected to one first orifice portion 241 are regarded as one first intermediate path portion group 235, a plurality of the first intermediate path portion groups 235 may be provided within one battery mounting space BS. Similarly, a plurality of the second intermediate path portion groups 236 may be provided within one battery mounting space BS.

Moreover, dimensions and shapes of the front frame 13, the rear frame 14, and the side frame 15 are not limited to the embodiment described above. Moreover, the numbers of the battery mounting spaces BS, the crosses 16, and the lower frames 18 are not limited either. Moreover, materials of the lower panel 11, the heat sink 12, the front frame 13, the rear frame 14, the side frame 15, the cross 16, the cross support member 17, the lower frame 18, and the share panel 19 are not limited to aluminum either. Various metallic materials can be applied to each of the members.

Moreover, the battery case 10 may include a lid member covering an upper side of an opening of a frame body constituted of the front frame 13, the rear frame 14, and the left and right side frames 15.

A vehicular battery case according to this disclosure includes a bottom plate portion. The bottom plate portion has a plate shape extending in a first direction and a second direction being perpendicular to each other, and is provided, in one surface, with a region where a battery is mountable, and provided, inside, with a temperature adjustment path being a path in which a fluid for adjusting a temperature of the battery is passable. The temperature adjustment path includes a first outer path portion and a second outer path portion being apart from each other in the first direction and having parts extending in the second direction, a central path portion being positioned between the first outer path portion and the second outer path portion, and extending in the second direction, a plurality of first intermediate path portions being positioned between the first outer path portion and the intermediate path portion and inside the region in a third direction view perpendicular to the first direction and the second direction, extending in the first direction, being in communication with the first outer path portion at an end on a side near the first outer path portion in the first direction, and being in communication with the central path portion at an end on a side near the central path portion in the first direction, and a plurality of second intermediate path portions being positioned between the second outer path portion and the central path portion and inside the region in the third direction view, extending in the first direction, being in communication with the second outer path portion at an end on a side near the second outer path portion in the first direction, and being in communication with the central path portion at an end on a side near the central path portion in the first direction.

According to this disclosure, by introducing, into the central path portion, a fluid (hereinafter, referred to as "temperature adjustment fluid") for adjusting a temperature of the battery, the temperature adjustment fluid can be passed toward both ends from a central portion of a region where the battery is mountable. Moreover, by introducing the temperature adjustment fluid into the first outer path portion and the second outer path portion, the temperature adjustment fluid can be passed toward the central portion from both ends of the region. Thus, such a configuration can prevent or restrain a temperature difference from being caused between both ends of the region, and can prevent or restrain a temperature difference from being caused between both ends and the central portion. Particularly, since a path of a cooling medium becomes short as compared with a configuration that passes a temperature adjustment fluid from one end of the region toward another end, an effect of preventing or restraining a temperature difference from being caused between both ends and the central portion of the region is high. Therefore, a temperature of the battery can be prevented or restrained from being uneven.

In the vehicular battery case according to this disclosure, the central path portion may include a first central path portion provided to be arranged in the first direction, and a second central path portion nearer the second outer path portion than the first central path portion. A plurality of the first intermediate path portions may be in communication with the first central path portion at an end on a side near the central path portion. A plurality of the second intermediate path portions may be in communication with the second central path portion at an end on a side near the central path portion.

Such a configuration can prevent or restrain a difference from being made between an amount of a temperature adjustment fluid flowing in the first intermediate path portion and an amount of a temperature adjustment fluid flowing in the second intermediate path portion, by having even amounts of fluids to be introduced into the first central path portion and the second central path portion. Therefore, a temperature difference can be prevented or restrained from being caused between a part close to one end of a mounted battery and a part close to another end.

In the vehicular battery case according to this disclosure, the region may be constituted of a plurality of battery mounting spaces being provided to be arranged in the second direction, and each having a long shape that is long in the first direction and short the second direction. In the third direction view, a plurality of the first intermediate path portions arranged in the second direction and a plurality of the second intermediate path portions arranged in the second direction may pass through each of the battery mounting spaces. A plurality of the first intermediate path portions passing through one of the battery mounting spaces may be in communication with one another by a first communication path portion at an end on a side near the first outer path portion and in communication with the first outer path portion via a first orifice portion. A plurality of the second intermediate path portions passing through one of the battery mounting spaces may be in communication with one another by a second communication path portion at an end on a side near the second outer path portion and in communication with the second outer path portion via a second orifice portion.

Such a configuration can prevent or restrain a variation in amounts of temperature adjustment fluids flowing in a plurality of the first intermediate path portions included in one of the battery mounting spaces, and a variation in amounts of temperature adjustment fluids flowing in a plurality of the second intermediate path portions included in one of the battery mounting spaces. Specifically, in a configuration in which each of a plurality of first intermediate path portions is independently in communication with a central path portion or a first outer path portion via an orifice portion, a variation may be made in amounts of temperature adjustment fluids flowing in a plurality of the first intermediate path portions, due to processing accuracy of the orifice portion. The same also applies to a plurality of second intermediate path portions. However, according to the configuration described above, since a variation in amount due to processing accuracy of the orifice portion is not made, unevenness in temperature of the battery can be prevented or restrained from being caused. Moreover, since management of dimensional accuracy of an orifice portion becomes easy as compared with a configuration in which one orifice portion is provided in one first intermediate path portion, and a configuration in which one orifice portion is provided in one second intermediate path portion, manufacturing cost can be reduced.

In the vehicular battery case according to this disclosure, a plurality of the first intermediate path portions passing through one of the battery mounting spaces in the third direction view may be partitioned by a plurality of first partition wall portions arranged in the second direction, and the first orifice portion and a particular first partition wall portion being one of a plurality of the first partition wall portions may be superposed in the first direction view. A plurality of the second intermediate path portions passing through one of the battery mounting spaces in the third direction view may be partitioned by a plurality of second partition wall portions arranged in the second direction, and the second orifice portion and a particular second partition wall portion being one of a plurality of the second partition wall portions may be superposed in the first direction view.

Such a configuration can prevent or restrain a difference from being made in amounts of temperature adjustment fluids flowing in a plurality of the first intermediate path portions connected to one first orifice portion. Similarly, such a configuration can prevent or restrain a difference from being made in amounts of temperature adjustment fluids flowing in a plurality of the second intermediate path portions connected to one second orifice portion. Specifically, with a configuration in which the first orifice portion is superposed over one of a plurality of the first intermediate path portions in a first direction view, when a temperature adjustment fluid flows from a side of the first orifice portion toward a plurality of the first intermediate path portions, the fluid that has passed through the first orifice portion flows into the first intermediate path portion superposed over the first orifice portion without losing momentum. Thus, an amount of a temperature adjustment fluid flowing in the first intermediate path portion superposed over the first orifice portion tends to be larger than an amount of a temperature adjustment fluid flowing in another first intermediate path portion. Therefore, a difference is made in amounts of temperature adjustment fluids flowing in a plurality of the first intermediate path portions, and as a result, a temperature distribution of the battery may become uneven.

However, according to the configuration described above, a temperature adjustment fluid that has flowed toward a plurality of the first intermediate path portions from a side of the first orifice portion once collides with an end of the first partition wall portion, changes the direction, and then flows into each of the first intermediate path portions. Similarly, a temperature adjustment fluid that has flowed toward a plurality of the second intermediate path portions from a side of the second orifice portion once collides with an end of the second partition wall portion, changes the direction, and then flows into each of the second intermediate path portions. Thus, the fluid that has passed through the first orifice portion is prevented from flowing into one particular first intermediate path portion without losing momentum. Similarly, the fluid that has passed through the second orifice portion is prevented from flowing into one particular second intermediate path portion without losing momentum. Thus, a difference can be prevented or restrained from being made in amounts of temperature adjustment fluids flowing in a plurality of the first intermediate path portions, and a difference can be prevented or restrained from being made in amounts of temperature adjustment fluids flowing in a plurality of the second intermediate path portions.

In the vehicular battery case according to this disclosure, an end of the particular first partition wall portion on a side near the first orifice portion may be positioned on a side nearer the first orifice portion in relation to the first direction than an end of the first partition wall portion other than the particular first partition wall portion on a side near the first orifice portion. An end of the particular second partition wall portion on a side near the second orifice portion may be positioned on a side nearer the second orifice portion in relation to the first direction than an end of the second partition wall portion other than the particular second partition wall portion on a side near the second orifice portion.

Such a configuration can prevent or restrain a difference from being made in amounts of temperature adjustment fluids flowing in a plurality of the first intermediate path portions connected to one first orifice portion. Similarly, such a configuration can prevent or restrain a difference from being made in amounts of temperature adjustment fluids flowing in a plurality of the second intermediate path portions connected to one second orifice portion. Specifically, when an end of another first partition wall portion other than the particular first partition wall portion on a side near the first orifice portion is positioned on a side nearer the first orifice portion in relation to the first direction than an end of the particular first partition wall portion on a side near the first orifice portion, the end of the another first partition wall portion becomes resistance of a fluid flowing from the first orifice portion to "the first intermediate path portion provided at a position farther than the another partition wall portion when seen from the first orifice portion" (hereinafter, referred to as "far first intermediate path portion"). Thus, amounts of a fluid flowing from the first orifice portion toward the far first intermediate path portion and a fluid flowing from the far first intermediate path portion toward the first orifice portion may be less than an amount of a fluid flowing to "the first intermediate path portion provided at a position nearer than the another partition wall portion when seen from the first orifice portion" (hereinafter, referred to as "near first intermediate path portion") (and a fluid flowing in an opposite direction). In contrast, the configuration described above can prevent or restrain an end of the another first partition wall portion from becoming resistance of a fluid flowing from the first orifice portion toward the far first intermediate path portion and a fluid flowing from the far first intermediate path portion toward the first orifice portion. Therefore, a difference can be prevented or restrained from being made in amounts of temperature adjustment fluids flowing in a plurality of the first intermediate path portions connected to one first orifice portion. The same also applies to a plurality of the second intermediate path portions.

In the vehicular battery case according to this disclosure, an end of the particular first partition wall portion on a side near the first orifice portion may include two particular first inclined surfaces being inclined surfaces inclined relative to the first direction in such a way that a distance from the first orifice portion becomes larger from a center of the particular first partition wall portion in the second direction as being toward outside in the second direction in the third direction view, and have a tapered shape that becomes smaller in dimension in the second direction as being nearer the first orifice portion. An end of the particular second partition wall portion on a side near the second orifice portion may include two particular second inclined surfaces being inclined surfaces inclined relative to the first direction in such a way that a distance from the second orifice portion becomes larger from a center of the particular second partition wall portion in the second direction as being toward outside in the second direction in the third direction view, and have a tapered shape that becomes smaller in dimension in the second direction as being nearer the second orifice portion.

With such a configuration, a flow direction of a fluid flowing from the first orifice portion toward the particular first partition wall portion is changed toward the far first intermediate path portion by two inclined surfaces provided at ends of the particular first partition wall portion. Then, a difference can be prevented or restrained from being made in amounts of fluids flowing in a plurality of the first intermediate path portions (the near first intermediate path portion and the far first intermediate path portion), by increasing an amount of a fluid flowing from the first orifice portion toward the far first intermediate path portion. The same also applies to the particular second partition wall portion.

In the vehicular battery case according to this disclosure, an end of another of the first partition wall portions other than the particular first partition wall portion on a side near the first outer path portion may include a first inclined surface being an inclined surface inclined relative to the first direction in such a way that a distance from the first orifice portion becomes farther from a surface on a side near the particular first partition wall portion in the second direction as being toward a surface on a side far from the particular first partition wall portion in the third direction view, and have a tapered shape that becomes smaller in dimension in the second direction as being nearer the first orifice portion. An end of another of the second partition wall portions other than the particular second partition wall portion on a side near the second outer path portion may include a second inclined surface being an inclined surface inclined relative to the first direction in such a way that a distance from the second orifice portion becomes farther from a surface on a side near the particular second partition wall portion in the second direction as being toward a surface on a side far from the particular second partition wall portion in the third direction view, and have a tapered shape that becomes smaller in dimension in the second direction as being nearer the second orifice portion.

Such a configuration can enhance an effect of preventing or restraining an amount of a fluid flowing from the first orifice portion toward the far first intermediate path portion from becoming less. Specifically, when the inclined surface as described above is provided at an end of another first partition wall portion, the another first partition wall portion can be prevented or restrained from becoming resistance of a fluid flowing from the first orifice portion toward a far intermediate path portion. Thus, an effect of preventing or restraining a difference from being made in amounts of flowing fluids between a near intermediate path portion and the far intermediate path portion can be enhanced. The same also applies to the second partition wall portion and the second intermediate path portion.

In the vehicular battery case according to this disclosure, the first inclined surface may be positioned on a side nearer the central path portion regarding the first direction than an extension line of one of the particular first inclined surfaces positioned on a side near the another of the first partition wall portions of two of the particular first inclined surfaces of the particular first partition wall portion in the third direction view. The second inclined surface may be positioned on a side nearer the central path portion regarding the first direction than an extension line of one of the particular second inclined surfaces positioned on a side near the another of the second partition wall portions of two of the particular second inclined surfaces of the particular second partition wall portion in the third direction view.

Such a configuration can enhance an effect of preventing or restraining a difference from being made in amounts of temperature adjustment fluids flowing in a plurality of the first intermediate path portions connected to one first orifice portion. Similarly, such a configuration can enhance an effect of preventing or restraining a difference from being made in amounts of temperature adjustment fluids flowing in a plurality of the second intermediate path portions connected to one second orifice portion. Specifically, when a distance from the first orifice portion up to the first inclined surface (an end of another first partition wall portion other than the particular first partition wall portion) is larger than a distance from the first orifice portion up to the particular first inclined surface, the end of the another first partition wall portion is prevented or restrained from becoming resistance of a fluid (a fluid flowing toward the far first intermediate path portion) that has been changed in flow direction toward the another first partition wall portion by the particular first inclined surface. Therefore, an effect of preventing or restraining a difference from being made in amounts of temperature adjustment fluids flowing in a plurality of the first intermediate path portions connected to one first orifice portion can be enhanced. The same also applies to a plurality of the second intermediate path portion.

In the vehicular battery case according to this disclosure, a sectional area of the first communication path portion being cut in a surface perpendicular to a circulation direction of the fluid may become larger from a side near the first orifice portion toward a far side. A sectional area of the second communication path portion being cut in a surface perpendicular to a circulation direction of the fluid may become larger from a side near the second orifice portion toward a far side.

Such a configuration can prevent or restrain a difference from being made in amounts of temperature adjustment fluids flowing in a plurality of the first intermediate path portions connected to one first orifice portion. Similarly, such a configuration can prevent or restrain a difference from being made in amounts of temperature adjustment fluids flowing in a plurality of the second intermediate path portions connected to one second orifice portion. Specifically, since pressure loss becomes great as being away from the first orifice portion, an amount of a temperature adjustment fluid flowing in the first intermediate path portion far from the first orifice portion becomes less than an amount of a temperature adjustment fluid flowing in the first intermediate path portion near the first orifice portion, when a sectional area of a path portion that brings the first orifice portion and each first intermediate path portion into communication is equal. In contrast, the configuration described above can prevent or restrain an amount of a temperature adjustment fluid flowing in the first intermediate path portion far from the first orifice portion from becoming less than an amount of a fluid flowing in the first intermediate path portion near the first orifice portion. The same also applies to a plurality of the second intermediate path portions.

In the vehicular battery case according to this disclosure, a frame body being erected in the third direction and surrounding the region may be provided in an outer peripheral portion of the bottom plate portion. The bottom plate portion may include an extension portion extending on an outer peripheral side of the frame body in the third direction view. One end of the central path portion may be positioned in the extension portion, and be in communication with outside of the bottom plate portion via a first supply-discharge portion provided in the extension portion. One end of each of the first outer path portion and the second outer path portion may be positioned in the extension portion, and the first outer path portion and the second outer path portion may be in communication with each other in the extension portion, and in communication with outside of the bottom plate portion via a second supply-discharge portion provided in the extension portion.

With such a configuration, since an occupancy area of a battery mounting space on an inner peripheral side of the frame body (a region surrounded by the frame body) can be large, battery energy density including the battery case can be enhanced. Moreover, since a pipe for discharging a temperature adjustment fluid can be connected to a pipe for introducing the temperature adjustment fluid on one side of the battery case, a degree of freedom in pipe layout in a vehicle is improved.

Moreover, with such a configuration, a temperature adjustment fluid that has been introduced into the temperature adjustment path via the first supply-discharge portion substantially equally flows into the first path portion and the second path portion. Moreover, a temperature adjustment fluid that has been introduced into the temperature adjustment path via the second supply-discharge portion substantially equally flows into a third path and a fourth path. Therefore, a difference can be prevented or restrained from being made in amounts of temperature adjustment fluids passing through a plurality of fifth path portions and a plurality of sixth path portions being included within the same one battery mounting space in the third direction view.

In the vehicular battery case according to this disclosure, the bottom plate portion may include plate-shaped first and second members stacked and joined to each other in the third direction. A bottomed groove portion opening on a side facing the first member may be provided in the second member. The groove portion covered by the first member may be the temperature adjustment path.

With such a configuration, since a temperature adjustment fluid directly contacts a lower surface of the first plate member, a heat exchange amount between the battery and the temperature adjustment fluid can be large. Therefore, an effect of temperature adjustment of the battery can be enhanced. Moreover, since weight saving of a bottom plate member can be achieved, density of battery energy in a configuration including the battery case can be enhanced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicular battery case comprising
a bottom plate portion having a plate shape extending in a first direction and a second direction being perpendicular to each other, and being provided, in one surface, with a region where a battery is mountable, and provided, inside, with a temperature adjustment path being a path in which a fluid for adjusting a temperature of the battery is passable, wherein the temperature adjustment path includes
a first outer path portion and a second outer path portion being apart from each other in the first direction and having parts extending in the second direction,
a central path portion being positioned between the first outer path portion and the second outer path portion, and extending in the second direction,
a plurality of first intermediate path portions being positioned between the first outer path portion and the central path portion and inside the region in a third direction view perpendicular to the first direction and the second direction, extending in the first direction, being in communication with the first outer path portion at an end on a side near the first outer path portion in the first direction, and being in communication with the central path portion at an end on a side near the central path portion in the first direction, and
a plurality of second intermediate path portions being positioned between the second outer path portion and the central path portion and inside the region in the third direction view, extending in the first direction, being in communication with the second outer path portion at an end on a side near the second outer path portion in the first direction, and being in communication with the central path portion at an end on a side near the central path portion in the first direction, and
wherein
the region is constituted of a plurality of battery mounting spaces being provided to be arranged in the second direction, and each having a long shape that is long in the first direction and short in the second direction,
in the third direction view, the plurality of the first intermediate path portions arranged in the second direction and the plurality of the second intermediate path portions arranged in the second direction pass through each of the battery mounting spaces,
the plurality of the first intermediate path portions passing through one of the battery mounting spaces are in communication with one another by a first communication path portion at an end on a side near the first outer path portion and in communication with the first outer path portion via a first orifice portion, and
the plurality of the second intermediate path portions passing through one of the battery mounting spaces are in communication with one another by a second communication path portion at an end on a side near the second outer path portion and in communication with the second outer path portion via a second orifice portion.

2. The vehicular battery case according to claim 1, wherein
the central path portion includes a first central path portion and a second central path portion, nearer the second outer path portion than the first central path portion, provided to be arranged in the first direction,
the plurality of the first intermediate path portions are in communication with the first central path portion at an end on a side near the central path portion, and
the plurality of the second intermediate path portions are in communication with the second central path portion at an end on a side near the central path portion.

3. The vehicular battery case according to claim 1, wherein
the plurality of the first intermediate path portions passing through one of the battery mounting spaces in the third direction view are partitioned by a plurality of first partition wall portions arranged in the second direction, and the first orifice portion and a particular first partition wall portion being one of a plurality of the first partition wall portions are superposed in the first direction view, and
the plurality of the second intermediate path portions passing through one of the battery mounting spaces in the third direction view are partitioned by a plurality of the second partition wall portions arranged in the second direction, and the second orifice portion and a particular second partition wall portion being one of a plurality of the second partition wall portions are superposed in the first direction view.

4. The vehicular battery case according to claim 3, wherein
an end of the particular first partition wall portion on a side near the first orifice portion is positioned on a side nearer the first orifice portion in relation to the first direction than an end of the first partition wall portion other than the particular first partition wall portion on a side near the first orifice portion, and
an end of the particular second partition wall portion on a side near the second orifice portion is positioned on a side nearer the second orifice portion in relation to the first direction than an end of the second partition wall portion other than the particular second partition wall portion on a side near the second orifice portion.

5. The vehicular battery case according to claim 3, wherein
an end of the particular first partition wall portion on a side near the first orifice portion includes two particular first inclined surfaces being inclined surfaces inclined relative to the first direction in such a way that a distance from the first orifice portion becomes larger from a center of the particular first partition wall portion in the second direction as being toward outside in the second direction in the third direction view, and has a tapered shape that becomes smaller in dimension in the second direction as being nearer the first orifice portion, and
an end of the particular second partition wall portion on a side near the second orifice portion includes two particular second inclined surfaces being inclined surfaces inclined relative to the first direction in such a way that a distance from the second orifice portion becomes larger from a center of the particular second partition wall portion in the second direction as being toward outside in the second direction in the third direction view, and has a tapered shape that becomes smaller in dimension in the second direction as being nearer the second orifice portion.

6. The vehicular battery case according to claim 5, wherein
an end of another of the first partition wall portions other than the particular first partition wall portion on a side near the first outer path portion includes a first inclined surface being an inclined surface inclined relative to the first direction in such a way that a distance from the first orifice portion becomes farther from a surface on a side near the particular first partition wall portion in the second direction as being toward a surface on a side far from the particular first partition wall portion in the third direction view, and has a tapered shape that becomes smaller in dimension in the second direction as being nearer the first orifice portion, and
an end of another of the second partition wall portions other than the particular second partition wall portion on a side near the second outer path portion includes a second inclined surface being an inclined surface inclined relative to the first direction in such a way that a distance from the second orifice portion becomes farther from a surface on a side near the particular second partition wall portion in the second direction as being toward a surface on a side far from the particular second partition wall portion in the third direction view, and has a tapered shape that becomes smaller in dimension in the second direction as being nearer the second orifice portion.

7. The vehicular battery case according to claim 6, wherein the first inclined surface is positioned on a side nearer the central path portion regarding the first direction than an extension line of one of the particular first inclined surfaces positioned on a side near the another of the first partition wall portions of two of the particular first inclined surfaces of the particular first partition wall portion in the third direction view, and the second inclined surface is positioned on a side nearer the central path portion regarding the first direction than an extension line of one of the particular second inclined surfaces positioned on a side near the another of the second partition wall portions of two of the particular second inclined surfaces of the particular second partition wall portion in the third direction view.

8. The vehicular battery case according to claim 1, wherein a sectional area of the first communication path portion being cut in a surface perpendicular to a circulation direction of the fluid becomes larger from a side near the first orifice portion toward a far side, and a sectional area of the second communication path portion being cut in a surface perpendicular to a circulation direction of the fluid becomes larger from a side near the second orifice portion toward a far side.

9. The vehicular battery case according to claim 1, wherein a frame body being erected in the third direction and surrounding the region is provided in an outer peripheral portion of the bottom plate portion, the bottom plate portion includes an extension portion extending on an outer peripheral side of the frame body in the third direction view, one end of the central path portion is positioned in the extension portion, and is in communication with outside of the bottom plate portion via a first supply-discharge portion provided in the extension portion, and one end of each of the first outer path portion and the second outer path portion is positioned in the extension portion, and the first outer path portion and the second outer path portion are in communication with each other in the extension portion, and in communication with outside of the bottom plate portion via a second supply-discharge portion provided in the extension portion.

10. The vehicular battery case according to claim 1, wherein the bottom plate portion includes plate-shaped first and second members stacked and joined to each other in the third direction, a bottomed groove portion opening on a side facing the first member is provided in the second member, and the groove portion covered by the first member is the temperature adjustment path.

* * * * *